United States Patent
Maturi et al.

(10) Patent No.: US 11,550,633 B2
(45) Date of Patent: Jan. 10, 2023

(54) INTRA-FOOTPRINT COMPUTING CLUSTER BRING-UP

(71) Applicant: Nutanix, Inc., San Jose, CA (US)

(72) Inventors: Mohan Maturi, San Jose, CA (US); Abhishek Arora, Santa Clara, CA (US); Manoj Sudheendra, Milpitas, CA (US)

(73) Assignee: Nutanix, Inc.

( * ) Notice: Subject to any disclaimer, the term of this patent is extended or adjusted under 35 U.S.C. 154(b) by 0 days.

(21) Appl. No.: 17/086,405

(22) Filed: Oct. 31, 2020

(65) Prior Publication Data

US 2022/0138014 A1 May 5, 2022

(51) Int. Cl.
*G06F 15/16* (2006.01)
*G06F 9/54* (2006.01)
(Continued)

(52) U.S. Cl.
CPC ........ *G06F 9/5072* (2013.01); *G06F 9/44505* (2013.01); *G06F 9/45558* (2013.01); *G06F 11/3006* (2013.01); *G06F 2009/45595* (2013.01)

(58) Field of Classification Search
CPC ............... G06F 9/5072; G06F 9/44505; G06F 9/45558; G06F 11/3006; G06F 2009/45595
(Continued)

(56) References Cited

U.S. PATENT DOCUMENTS 7,386,697 B1 * 6/2008 Case .................. G06F 12/1027
711/E12.043
7,412,479 B2 8/2008 Arendt et al.
(Continued)

FOREIGN PATENT DOCUMENTS

KR 101998564 B1 7/2019

OTHER PUBLICATIONS

Zagorsek, Hugo, Anja Cotic Svetina, and Marko Jaklič. "Leadership in Clusters: Attributes of Effective Cluster Leader in Slovenia." Transformations in business & economics 7.2 (2008). (Year: 2008).*
(Continued)

*Primary Examiner* — Hamza N Algibhah
(74) *Attorney, Agent, or Firm* — Vista IP Law Group, LLP

(57) ABSTRACT

Methods, systems and computer program products for intra-footprint computing cluster bring-up within a virtual private cloud. A network connection is established between an initiating module and a virtual private cloud (VPC). An initiating module allocates resources of the virtual private cloud including a plurality of nodes that correspond to members of a to-be-configured computing cluster. A cluster management module having coded therein an intended computing cluster configuration is configured into at least one of the plurality of nodes. The members of the to-be-configured computing cluster interoperate from within the VPC to accomplish a set of computing cluster bring-up operations that configure the plurality of members into the intended computing cluster configuration. Execution of bring-up instructions of the management module serve to allocate networking IP addresses of the virtual private cloud. The allocated networking IP addresses of the virtual private cloud are assigned to networking interfaces of the plurality of nodes.

21 Claims, 12 Drawing Sheets

(51) Int. Cl.
  *H04L 29/06* (2006.01)
  *G06F 9/50* (2006.01)
  *G06F 9/455* (2018.01)
  *G06F 11/30* (2006.01)
  *G06F 9/445* (2018.01)

(58) Field of Classification Search
  USPC .......................................................... 709/221
  See application file for complete search history.

(56) References Cited

U.S. PATENT DOCUMENTS

| | | | |
|---|---|---|---|
| 8,549,518 B1 | 10/2013 | Aron et al. | |
| 8,601,473 B1 | 12/2013 | Aron et al. | |
| 8,850,130 B1 | 9/2014 | Aron et al. | |
| 9,772,866 B1 | 9/2017 | Aron et al. | |
| 10,474,501 B2 | 11/2019 | Ghodsi et al. | |
| 10,841,152 B1* | 11/2020 | Humphreys | G06F 9/45558 |
| 2009/0113034 A1* | 4/2009 | Krishnappa | G06F 15/16 709/223 |
| 2011/0289343 A1 | 11/2011 | Schaefer et al. | |
| 2013/0159380 A1 | 6/2013 | Alam et al. | |
| 2014/0149590 A1* | 5/2014 | Mallipeddi | G06F 9/5088 709/226 |
| 2015/0236978 A1* | 8/2015 | Gulati | H04L 47/783 709/226 |
| 2017/0339008 A1* | 11/2017 | Dion | H04L 12/4641 |
| 2019/0190778 A1* | 6/2019 | Easterling | H04L 67/34 |
| 2020/0026625 A1* | 1/2020 | Konka | H04L 41/0668 |
| 2020/0028901 A1* | 1/2020 | Suresh | H04L 41/0813 |
| 2020/0084110 A1* | 3/2020 | Kim | H04L 41/0893 |
| 2021/0124624 A1 | 4/2021 | Jeong | |
| 2021/0397465 A1* | 12/2021 | Mellquist | G06F 9/5083 |
| 2021/0397466 A1* | 12/2021 | McKee | H04L 67/14 |
| 2022/0138014 A1 | 5/2022 | Maturi et al. | |

OTHER PUBLICATIONS

Poitras, Steven. "The Nutanix Bible" (Oct. 15, 2013), from http://stevenpoitras.com/the-nutanix-bible/ (Publication date based on indicated capture date by Archive.org; first publication date unknown).
Poitras, Steven. "The Nutanix Bible" (Jan. 11, 2014), from http://stevenpoitras.com/the-nutanix-bible/ (Publication date based on indicated capture date by Archive.org; first publication date unknown).
Poitras, Steven. "The Nutanix Bible" (Jun. 20, 2014), from http://stevenpoitras.com/the-nutanix-bible/ (Publication date based on indicated capture date by Archive.org; first publication date unknown).
Poitras, Steven. "The Nutanix Bible" (Jan. 7, 2015), from http://stevenpoitras.com/the-nutanix-bible/ (Publication date based on indicated capture date by Archive.org; first publication date unknown).
Poitras, Steven. "The Nutanix Bible" (Jun. 9, 2015), from http://stevenpoitras.com/the-nutanix-bible/ (Publication date based on indicated capture date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Poitras, Steven. "The Nutanix Bible" (Jul. 9, 2019), from https://nutanixbible.com/ (Publication date based on indicated capture date by Archive.org; first publication date unknown).
Poitras, Steven. "The Nutanix Bible" (Feb. 3, 2020), from https://nutanixbible.com/ (Publication date based on indicated capture date by Archive.org; first publication date unknown).
Poitras, Steven. "The Nutanix Bible" (Aug. 1, 2020), from https://nutanixbible.com/ (Publication date based on indicated capture date by Archive.org; first publication date unknown).
Poitras, Steven. "The Nutanix Bible" (Jan. 30, 2021), from https://nutanixbible.com/ (Publication date based on indicated capture date by Archive.org; first publication date unknown).
Cano, I. et al., "Curator: Self-Managing Storage for Enterprise Clusters", *14th USENIX Symposium on Networked Systems Design and Implementation, NSDI '17*, (Mar. 27, 2017).
Addison, L., "Cluster API: Past, Present and Future", Jetstack Ltd., (Jan. 7, 2020).
Micro Focus, "Open Enterprise Server 2018 SP2: OES Cluster Services for Linux", Administration Guide, Micro Focus, (May 2020).
Red Hat, "Red Hat Enterprise Linux CoreOS (RHCOS)", Red Hat, Inc., (Jun. 21, 2020), (Publication date based on indicated capture date by Archive.org; first publication date unknown).
"Cloudbreak 2.4.0 Introduction," Cloudera, URL: https://docs.cloudera.eom/HDPDocuments/Cloudbreak/Cloudbreak-2.4.0/content/index.html, downloaded on May 11, 2022.
"Cloudbreak Architecture," Cloudera, URL: https://docs.cloudera.eom/HDPDocuments/Cloudbreak/Cloudbreak-2.4.0/content/architecture/index.html, date found via Internet Archive as Sep. 21, 2021.
"Cloudbreak Security Overview," Cloudera, URL: https://docs.cloudera.com/HDPDocuments/Cloudbreak/Cloudbreak-2.4.0/content/security/index.html#identity-management, date found via Internet Archive as Sep. 21, 2021.
"Creating Your First Streams Messaging Cluster in CDP Public Cloud," Cloudera, URL: https://docs.cloudera.com/cdf-datahub/7.2.10/quick-start-sm/topics/cdf-datahub-sm-cluster-quick-start-createcluster.html?, dated Jun. 14, 2021.
Chemitiganti, V., "Kubernetes in the Enterprise—Chapter 7: What You Need to Know About Platform9 Managed Kubernetes," Platform9, URL: https://platform9.com/blog/kubernetes-in-the-enterprise-chapter-7-what-you-need-to-know-about-platform9-managed-kubernetes/, dated Jun. 9, 2021.
Nimje, S., "How to Set Up a Shared Kubernetes Cluster on AWS using Platform9 Managed Kubernetes," Platform9, URL: https://platform9.com/blog/how-to-set-up-a-shared-kubernetes-cluster-on-aws/, dated Jun. 9, 2021.
"AWS Cloud Provider Management," Platform9, URL: https://platform9.com/docs/v5.1/kubernetes/add-aws-cloud-provider, downloaded on May 11, 2022.
"Red Hat Advanced Cluster Management for Kubernetes," URL: https://www.redhat.com/en/technologies/management/advanced-cluster-management, date found via Internet Archive as Aug. 20, 2020.
"Chapter 1. Managing Your Clusters," Red Hat, URL: https://access.redhat.com/documentation/en-us/red_hat_advanced_cluster_management_for_kubernetes/2.4/html/clusters/managing-your-clusters, date found via Google as Mar. 19, 2020.
"Chapter 4. Installing on AWS," Red Hat, URL: https://access.redhat.com/documentation/en-us/openshift_container_platform/4.9/html/installing/installing-on-aws, date found via Google as May 15, 2022.
"Chapters. Installing on Azure," Red Hat, URL: https://access.redhat.com/documentation/en-us/openshift_container_platform/4.9/html/installing/installing-on-azure, date found via Google as May 15, 2022.
"Chapter 7. Installing on GCP," Red Hat, URL: https://access.redhat.com/documentation/en-us/openshift_container_platform/4.9/html/installing/installing-on-gcp, date found via Internet Archive as Mar. 13, 2022.

(56) References Cited

OTHER PUBLICATIONS

"Chapter 7. Creating a cluster," Red Hat, URL: https://access.redhat.com/documentation/en-us/red_hat_advanced_cluster_management_for_kubernetes/2.1/html/manage_cluster/creating-a-cluster, downloaded on May 11, 2022.
"Red Hat Advanced Cluster Management for Kubernetes (RHACM)," YouTube Video, Uploaded on Dec. 4, 2021, URL: https://www.youtube.com/watch?v=58Z91cBiNxE.
"Amazon EKS Anywhere: Create and operate Kubernetes clusters on your own infrastructure," AWS, URL: https://aws.amazon.com/eks/eks-anywhere/?msclkid=7012118bcf5711ec97f70635e15def61, date found via Google as Dec. 21, 2020.
"Granting access to a user to view Kubernetes resources on a cluster," AWS, URL: https://docs.aws.amazon.com/eks/latest/userguide/connector-grant-access.html, date found via Google as Sep. 7, 2021.
"Install EKS Anywhere," Amazon AWS, URL: https://anywhere.eks.amazonaws.com/docs/getting-started/install/, date found via Google as Sep. 8, 2021.
"Cluster creation workflow," Amazon AWS, URL: https://anywhere.eks.amazonaws.com/docs/concepts/clusterworkflow/, date found via Google as Sep. 8, 2021.
"AuthN / AuthZ," Amazon AWS, URL: https://anywhere.eks.amazonaws.com/docs/reference/faq/#authn--authz, downloaded on May 11, 2022.
"Anthos technical overview," Google Cloud, URL: https://cloud.google.com/anthos/docs/concepts/overview, date found via Internet Archive as Sep. 16, 2020.
"Anthos clusters on AWS documentation," Google Cloud, URL: https://cloud.google.com/anthos/clusters/docs/multi-cloud/aws, date found via Internet Archive as Mar. 18, 2022.
"Deploy an application on Anthos clusters on Azure," Google Cloud, URL: https://cloud.google.com/anthos/clusters/docs/multi-cloud/azure/deploy-app, downloaded on May 11, 2022.
"Create a Cluster," Oracle Help Center, URL: https://docs.oracle.com/en/cloud/paas/big-data-compute-cloud/csspc/create-cluster.html, date found via Google as Jan. 18, 2019.
"Bringing Up Clusters in the WebUI or CLI," Commvault, URL: https://documentation.commvault.com/cds/121157_bringing_up_clusters_in_webui_or_cli.html, dated Jan. 7, 2022.
"What is cloud management?," Red Hat, URL: https://www.redhat.com/en/topics/cloud-computing/what-is-cloud-management, dated Mar. 7, 2018.
"Observability: Red Hat Advanced Cluster Management for Kubernetes 2.3," Red Hat, URL: https://access.redhat.com/documentation/en-us/red_hat_advanced_cluster_management_for_kubernetes/2.3/html-single/observability/index, date found via Google as Aug. 9, 2021.
"Support: Openshift Container Platform 4.8," Red Hat, URL: https://access.redhat.com/documentation/en-us/openshift_container_platform/4.8/html-single/support/index#about-remote-health-monitoring, downloaded on May 12, 2022.
"What is Amazon EKS?," AWS, URL: https://docs.aws.amazon.com/eks/latest/userguide/what-is-eks.html, date found via Internet Archive as Mar. 3, 2022.
"Amazon EKS nodes," AWS, URL: https://docs.aws.amazon.com/eks/latest/userguide/eks-compute.html, date found via Internet Archive as Jun. 6, 2022.
"Monitor metrics with CloudWatch," AWS, URL: https://docs.aws.amazon.com/emr/latest/ManagementGuide/UsingEMR_ViewingMetrics.html, date found via Internet Archive as Mar. 25, 2022.
"Managing and Monitoring Clusters," Cloudbreak, URL: https://docs.cloudera.com/HDPDocuments/Cloudbreak/Cloudbreak-2.4.2/content/os-clusters-manage/index.html, date found via Google as Aug. 12, 2019.
"Features," Kubesphere, URL: https://kubesphere.io/docs/v3.3/introduction/features/, dated Nov. 2, 2021.
"Kubernetes Multi-Cluster Management—Overview," Kubesphere, URL: https://kubesphere.io/docs/v3.3/multicluster-management/introduction/overview/, dated Apr. 14, 2021.
"Cluster Status Monitoring," Kubesphere, URL: https://kubesphere.io/docs/v3.3/cluster-administration/cluster-status-monitoring/, dated Nov. 2, 2021.
"PMK Product Overview," Platform9, URL: https://platform9.com/docs/v5.1/kubernetes/introduction-overview#24x7-live-monitoring-and-management-of-your-kubernetes-clusters, downloaded on May 12, 2022.
"Enable In-Cluster Monitoring," Platform9, URL: https://platform9.com/docs/kubernetes/enabling-in-cluster-monitoring, dated Apr. 1, 2022.
"What is Azure Arc-enabled Kubernetes?,"Microsoft Docs, URL: https://docs.microsoft.com/en-us/azure/azure-arc/kubernetes/overview, dated May 4, 2022.
"Azure Monitor overview," Microsoft Docs, URL: https://docs.microsoft.com/en-us/azure/azure-monitor/overview, dated Jul. 29, 2022.
"Azure Arc hybrid management and deployment for Kubernetes clusters," Microsoft Docs, URL: https://docs.microsoft.com/en-us/azure/architecture/hybrid/arc-hybrid-kubernetes, date found via Internet Archive as Feb. 8, 2022.
"What is Dataproc?," Microsoft Docs, URL: https://cloud.google.com/dataproc/docs/concepts/overview, date found via Internet Archive as Mar. 2, 2022.
"Cluster web interfaces," Google Cloud, https://cloud.google.com/dataproc/docs/concepts/accessing/cluster-web-interfaces, date found via Internet Archive as Aug. 2, 2021.
"Class Cluster," Google.Apis, URL: https://googleapis.dev/dotnet/Google.Apis.Dataproc.v1/latest/api/Google.Apis.Dataproc.v1.Data.Cluster.html, date found via Google as May 2019.

* cited by examiner

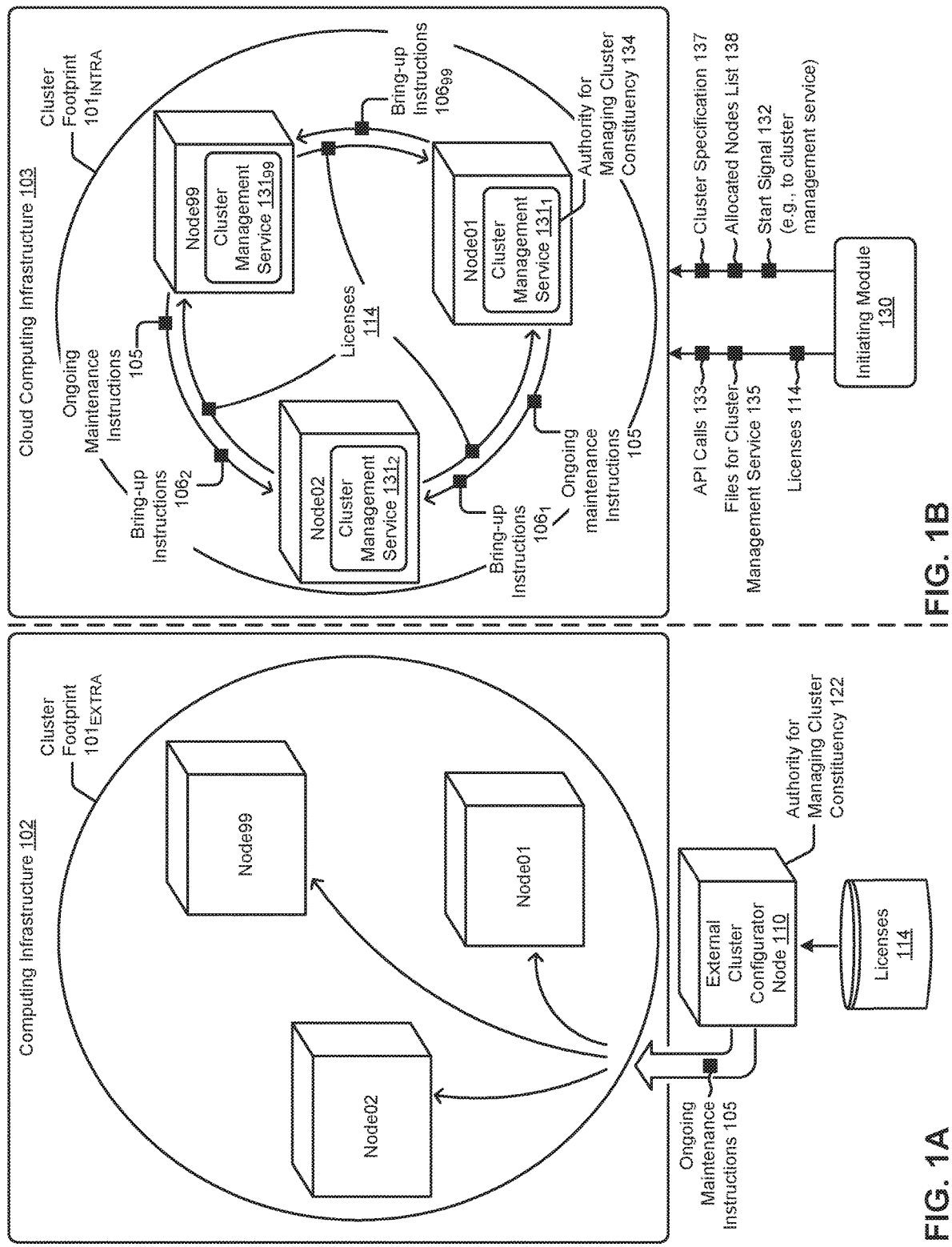

INTRA-FOOTPRINT COMPUTING CLUSTER BRING-UP

TECHNICAL FIELD

This disclosure relates to the dynamic configuration of a computing cluster, and more particularly to techniques for intra-footprint computing cluster bring-up and ongoing cluster management.

BACKGROUND

When bringing up a new cluster, many computing and networking resources are needed. The problem addressed here is how to perform all the needed cluster bring-up operations without requiring resources other than those resources provided by the cluster itself. In other words, the problem addressed here is how to perform all the needed cluster bring-up operations using only the footprint of resources provided by the cluster itself. This footprint refers to hardware resources as well as software resources as well as licenses pertaining to the hardware and/or software.

Furthermore, in public cloud computing scenarios where only a particular extent of software and hardware might be licensed by a customer, the new cluster must be brought up and be configurable to operate on an ongoing basis using only resources that are within the bounds of the customer's account (e.g., within the bounds of the customer's subscription to the public cloud service). This is because customers do not want to have to expand their subscription (e.g., pay for more resources) merely for the purpose of bringing up and maintaining a cluster. As such, performing all the needed cluster bring-up operations need to be accomplished without requiring resources other than those that are within the bounds of the customer's subscription to the public cloud service.

The problem becomes complicated when characteristics of the public cloud resources are considered. For example, many public cloud purveyors allocate "bare metal" nodes on demand, however these "bare metal" nodes are often initially pre-configured with a particular operating system that is intended to be a standalone node (i.e., not a node that is a member of a computing cluster). This introduces a need to re-image the bare metal. However doing so from a node that lies outside of the customer's public cloud subscription footprint is fraught with challenges—such as a high network latency, reliance on Internet access, and reliance on health of the outside node. Moreover, configuring a cluster from a node that lies outside of the customer's public cloud subscription footprint introduces additional failure domains and additional failure scenarios that would need to be addressed, thus leading to sub-optimal availability profiles.

As another example of complexities introduced by the context of a public cloud purveyor's infrastructure configuration, consider that public cloud purveyors offer their own networking infrastructure that would need to be configured in a particular manner so as to be able to provide networking routing capabilities that underlie node-to-node network routes between members of a computing cluster. Determining the characteristics of the public cloud purveyor's networking infrastructure is difficult and sometimes impossible to do from a node that lies outside of the customer's public cloud subscription footprint.

The problem becomes still further complicated when customer requirements such as a replication factor, high-availability metrics, headroom minimums, etc. have to be honored. These types of cluster-wide requirements are difficult and sometimes impossible to do from a node that lies outside of the customer's public cloud subscription footprint.

Still additional problems emerge when considering that virtual networking mechanisms need to be constantly maintained to be used with the underlying public cloud purveyor's networking infrastructure. Maintaining these virtual networking mechanisms to be in synch with the underlying physical networking infrastructure introduces networking latency, and thus is extremely sub-optimal to do from a node that lies outside of the customer's public cloud subscription footprint.

Therefore, what is needed is a technique or techniques that accomplish cluster bring-up without requiring resources beyond those resources provided by the subscription footprint of the customer.

SUMMARY

This summary is provided to introduce a selection of concepts that are further described elsewhere in the written description and in the figures. This summary is not intended to identify key features or essential features of the claimed subject matter, nor is it intended to limit the scope of the claimed subject matter. Moreover, the individual embodiments of this disclosure each have several innovative aspects, no single one of which is solely responsible for any particular desirable attribute or end result.

The present disclosure describes techniques used in systems, methods, and in computer program products for performing an intra-footprint computing cluster bring-up and ongoing cluster management, which techniques advance the relevant technologies to address technological issues with legacy approaches. More specifically, the present disclosure describes techniques used in systems, methods, and in computer program products for deploying a cluster management service into a node or nodes of a to-be-configured computing cluster such that remaining cluster bring-up operations can be performed within the cluster's own footprint. Certain embodiments are directed to techniques for loading a set of intra-cluster bring-up operations into a node or nodes, of a to-be-configured computing cluster.

The disclosed embodiments modify and improve over legacy approaches. In particular, the herein-disclosed techniques provide technical solutions that address the technical problems attendant cluster bring-up and ongoing cluster management without requiring resources other than those resources provided by the cluster itself. Such technical solutions involve specific implementations (i.e., data organization, data communication paths, module-to-module interrelationships, etc.) that relate to the software arts for improving computer functionality.

The ordered combination of steps of the embodiments serve in the context of practical applications that perform bring-up of a computing cluster within its own hardware and software footprint. As such, the disclosed techniques for performing intra-cluster operations overcome long standing yet heretofore unsolved technological problems associated with how to schedule operations to bring-up a computing cluster without requiring resources other than those resources provided by the cluster itself.

Many of the herein-disclosed embodiments include loading a set of intra-cluster bring-up instructions into an initial node of a to-be-configured computing cluster, and as such, are technological solutions pertaining to technological problems that arise in the hardware and software arts that underlie configuring computing clusters. Aspects of the present disclosure achieve performance and other improvements in peripheral technical fields including, but not limited to, hyperconverged computing platform management and scheduling operations that are carried out in the context of computing cluster deployments.

Some embodiments include a sequence of instructions that are stored on a non-transitory computer readable medium. Such a sequence of instructions, when stored in memory and executed by one or more processors, cause the one or more processors to perform a set of acts for loading a set of intra-cluster bring-up operations into an initial node of a to-be-configured computing cluster.

Some embodiments include the aforementioned sequence of instructions that are stored in a memory, which memory is interfaced to one or more processors such that the one or more processors can execute the sequence of instructions to cause the one or more processors to implement acts for loading a set of intra-cluster bring-up operations into an initial node of a to-be-configured computing cluster.

In various embodiments, any combinations of any of the above can be combined to perform any variations of acts for deploying a cluster management service into a node of a to-be-configured computing cluster such that remaining cluster bring-up operations can be performed within the cluster's own footprint, and many such combinations of aspects of the above elements are contemplated.

Further details of aspects, objectives and advantages of the technological embodiments are described herein, and in the figures and claims.

BRIEF DESCRIPTION OF THE DRAWINGS

The drawings described below are for illustration purposes only. The drawings are not intended to limit the scope of the present disclosure.

FIG. 1A and FIG. 1B are presented to show a comparison that illustrates use of an external cluster configurator node to perform cluster bring-up (FIG. 1A) as compared with a technique for deployment of a cluster management service layer onto nodes of a to-be-configured cluster (FIG. 1B).

DETAILED DESCRIPTION

Figure 2A:
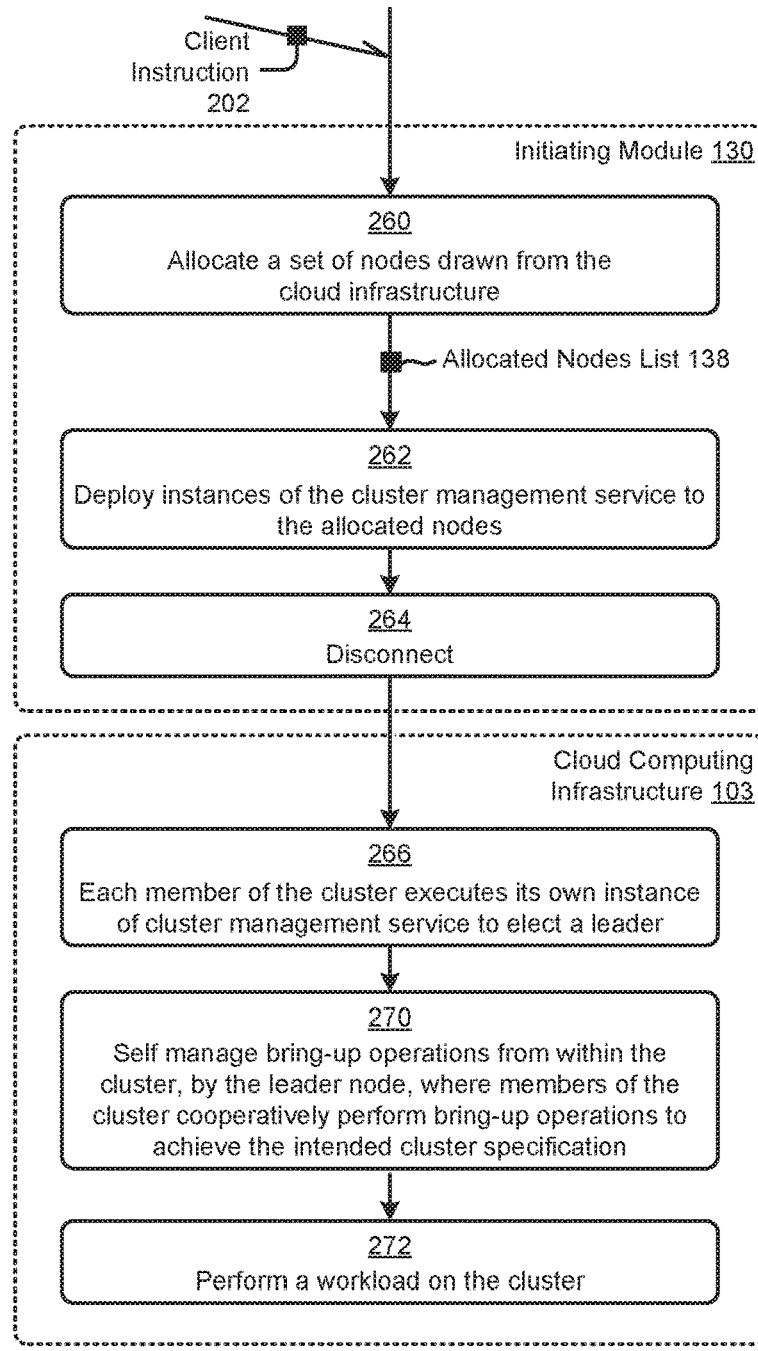
FIG. 2A depicts an example system that configures a cluster environment for self-contained bring-up, according to an embodiment.

Aspects of the present disclosure solve problems associated with using computer systems to perform cluster bring-up and ongoing cluster maintenance operations without requiring resources other than those resources provided by the cluster itself. Some embodiments are directed to approaches for loading a set of predetermined intra-cluster operations into an initial node of a to-be-configured computing cluster. The accompanying figures and discussions herein present example environments, systems, methods, and computer program products for deploying a cluster management service into a node of a to-be-configured computing cluster such that remaining cluster bring-up and ongoing maintenance operations can be performed within the cluster's own footprint.

Overview

One embodiment implements a management layer to guarantee that all cluster bring-up operations can be carried out using only the footprint of resources provided by the cluster itself. The management layer may be implemented as a module that runs on each node of a to-be-configured cluster. More specifically, the management layer may be configured as an interconnected set of module instances that run on respective nodes of a to-be-configured cluster.

The management layer may be further configured to handle ongoing cluster maintenance operations such as to add a node to the cluster, to remove a node, to perform maintenance upgrades and re-boots, to expand the cluster, to shrink the cluster, to destroy the cluster, etc. Moreover the management layer may be further configured to perform in any environment or scenario. Strictly as one example scenario, there are certain settings, such as occur in cloud-based computing environments, where infrastructure is allocated on an as-needed basis. It can happen that a computing node might be allocated from the cloud infrastructure provider only for it later to be discovered that the node is unhealthy. As such, the management layer may be configured to handle this situation as well as other ongoing cluster maintenance situations throughout the whole lifecycle of the cluster.

To improve high availability of the cluster, the management layer may be configured to handle the foregoing maintenance operations fully within the footprint of resources provided by the cluster itself, thereby reducing reliance on the operational status or reachability of external components. More specifically, when ongoing maintenance operations can be performed using only resources drawn from within the resources provided by the cluster itself, the high availability of the cluster is improved, at least to the extent that the availability profile (or failure profile) of components outside of the footprint of the cluster do not affect the availability profile of the cluster itself.

The ability to deploy and manage a high availability cluster fully within itself leads to hardening of the cluster against malicious attacks. Moreover, there are some situations where a cluster may be purposely deployed into a pre-hardened environment where security policies serve to decrease the likelihood or impact of malicious attacks. In some such hardened environments, the security policies that govern operations within the pre-hardened environment may not even permit deployment of additional resources that are drawn from outside the pre-hardened environment. The herein-disclosed management layer and techniques for using such a management layer addresses the foregoing such that a high availability cluster may be brought up and configured to handle ongoing maintenance operations fully within the footprint of resources provided by the cluster itself.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A illustrates a use of an external cluster configurator node. The figure is being presented to illustrate use of an external cluster configurator node to perform cluster bring-up (FIG. 1A) as compared with a technique that deploys instances of cluster management services onto nodes of a to-be-configured cluster (FIG. 1B).

As shown, the deployment of FIG. 1A has an external cluster configurator node 110 that sends ongoing maintenance instructions 105 to the nodes of a to-be-configured computing cluster, whereas in the deployment of FIG. 1B the cluster is brought-up strictly from within its own footprint. In the architecture of FIG. 1A, the external cluster configurator node 110 needs to be operational and in constant network communication with the nodes of the computing cluster during the entire duration of bring-up. Moreover, in the architecture of FIG. 1A, the external cluster configurator node 110 needs to be operational and in constant network communication with the nodes over the entire life cycle of the cluster. This leads to sub-optimal scenarios, at least because (1) this architecture relies on extremely high availability of the external cluster configurator node 110, and (2) this architecture relies on extremely high availability of any network infrastructure between the external cluster configurator node 110 and the computing infrastructure 102.

To illustrate using the architecture shown in FIG. 1A, there are three nodes (e.g., node01, node02, and node99) within the shown computing infrastructure 102, all three of which are situated within cluster footprint $101_{EXTRA}$. The external cluster configurator node 110 is outside of the cluster footprint $101_{EXTRA}$ and, as such, ongoing maintenance instructions 105 flow continuously across the boundary of the footprint. This architecture sets up the undesirable scenario where the external cluster configurator node 110 must have extremely high availability. Moreover, this architecture sets up the undesirable scenario where the external cluster configurator node is required during the entire duration of the life cycle of the cluster. This is because, in the architecture of FIG. 1A, the authority for managing cluster constituency 122 is outside of the to-be-configured cluster footprint.

Consider a case where the three nodes are all nodes that have been allocated by a cloud computing tenant, say "TenantA." In such a case, the architecture of FIG. 1A leads to sub-optimal outcomes. In another sub-optimal scenario, the external cluster configurator node 110 would have to be allocated into the footprint of TenantA, thus causing additional expense and other burdens to attach to the customer. Or, in another sub-optimal scenario, inter-tenant security rules would have to be relaxed or disabled, and/or virtual private cloud peering or similar networking capabilities might need to be supported by the provider of the computing infrastructure 102. These sub-optimal scenarios are further complicated by the fact that the licenses that might be needed for operation of the cluster are external to TenantA's cluster footprint $101_{EXTRA}$. For example, certain licensed networking software might be needed for the desired cluster, however the architecture of FIG. 1A assumes that at least one of the three nodes (e.g., node01, node02, or node99) already has sufficient networking software licenses in order to reach the licenses 114. In yet another sub-optimal scenario, specialized management services (e.g., Kubernetes services) are bootstrapped onto an additional node in a customer's account and thus, unfortunately, computing node resources beyond the computing node resources of the to-be-configured cluster are demanded for bring-up.

The emergence of virtual private clouds further complicates the above scenarios. As used herein a virtual private cloud (VPC) is an on-demand configurable pool of shared computing infrastructure situated within a cloud computing environment. VPCs can be configured on a tenant-by-tenant basis so as to provide isolation between different tenants. For example, isolation between one tenant's VPC all other tenants of the same cloud computing environment can be achieved through configuration of a private IP subnet. Many levels of security can be applied and enforced in a given VPC. In some cases virtual communication constructs such as VLANs or tunnels can be configured in a per-tenant basis.

In one example virtual private cloud scenario, if a customer wants to deploy a cluster in a virtual private cloud setting or within a private network, it may happen that the cloud provider may enforce security policies over the virtual private cloud or any subordinate private networks such that the cloud provider may not even permit networking-in of external resources since, for security reasons, there may be policies in force that are specifically intended to disallow operations that would potentially increase the likelihood or impact of a malicious attack on the VPC. This creates a dire need for a cluster to be configured and maintained fully within itself.

To address the foregoing problems, disclosed hereunder is an architecture that deploys instances of a specially-configured cluster management service onto one or more nodes of a to-be-configured cluster. Once deployed, the specially-configured cluster management service can carry out next steps to configure the desired cluster without demanding computing node resources beyond the computing node resources of the to-be-configured cluster. Once brought up to an operational state, the cluster can self-maintain itself on an ongoing basis—yet still without demanding computing resources beyond the computing resources of the logical and physical footprint of the cluster. Such an improved architecture is shown and discussed as pertains to FIG. 1B.

FIG. 1B illustrates a deployment of cluster management service layer onto nodes of a to-be-configured cluster such that cluster bring-up operations can be performed within the cluster's own hardware infrastructure (e.g., computing nodes and networking components) and software infrastructure (e.g., feature modules and licenses).

As used herein, a cluster management service is a collection of executable code that runs on each node of a to-be-configured node of a cluster. A plurality of cluster management service modules may be deployed as separately-configured instances of the executable code that runs on each node of a to-be-configured node of a cluster.

The initiating module 130 handles a minimal set of cluster bootstrapping operations. In this embodiment, the set of cluster bootstrapping operations includes (1) executing application programming interface (API) calls (e.g., API calls 133) to allocate nodes from among the cloud computing infrastructure 103; (2) deploying files (e.g., code, binaries, script) for cluster management service 135 that are loaded onto the allocated nodes; (3) providing the instances of cluster management service with cluster specification 137 that includes an allocated nodes list 138; and (4) providing the instances of cluster management services with any licenses that might be needed for bring-up and ongoing operation of the cluster.

Once the node-specific instances of cluster management services have been deployed and configured, and once the initiating module confirms that the one or more instances of cluster management service are configured to have (1) a copy of the cluster specification 137; (2) a copy of business logic (e.g., replication factor settings); (3) any initializing instructions for initial cluster bring-up; and (4) licenses 114 needed for bring-up and operation of the to-be-configured cluster, then the initiating module can send a start signal 132 before disconnecting from the cloud computing infrastructure 103.

As used herein, an initiating module is any collection of code that can allocate nodes from a cloud infrastructure provider. An initiating module may further include any collection of code that can carry out network communications with any one or more nodes that have been allocated from a cloud infrastructure provider.

The architecture of FIG. 1B supports many variations. Strictly as examples, the initiating module can load a node-specific instance of the cluster management service (e.g., node-specific instance of cluster management service $131_1$, node-specific instance of cluster management service $131_2$, and node-specific instance of cluster management service $131_{99}$) onto each node (e.g., node01, node02, and node99), after which the start signal can be raised. Alternatively, the initiating module can load all node-specific instances of the cluster management service onto a single designated node (e.g., node01 with node-specific instance of cluster management service $131_{99}$), and that single designated node can distribute the remaining node-specific instances of the cluster management service (e.g., node-specific instance of cluster management service $131_2$ and node-specific instance of cluster management service $131_{99}$) onto the corresponding nodes (e.g., node02 and node99).

Furthermore, and as shown, the nodes can communicate among themselves (e.g., using their respective node-specific instance of the cluster management service). More specifically, the nodes within cluster footprint $101_{INTRA}$ can communicate among themselves to share and/or execute bring-up instructions and licenses. Strictly as one example, node01 can communicate bring-up instructions $106_1$ to node02, and node02 can communicate bring-up instructions $106_2$ to node99. Additionally or alternatively, node01 can communicate bring-up instructions $106_{99}$ to node99, etc. Additionally, node01 can communicate ongoing maintenance instructions 105 to node02, and node01 can communicate ongoing maintenance instructions 105 to node099, etc. Furthermore, in addition to passing around bring-up instructions and ongoing maintenance instructions between nodes within cluster footprint $101_{INTRA}$, licenses can be passed around between any nodes within cluster footprint $101_{INTRA}$. Still further, the authority for managing cluster constituency 134 is situated within cluster footprint $101_{INTRA}$.

The foregoing architecture of FIG. 1B, and specifically the management layer formed by occurrences of the cluster management service, supports self-contained bring-up and ongoing maintenance. Moreover, since the nodes of the to-be-configured cluster are all situated in the customer's virtual private network (e.g., in the same subnet), communication latency between the occurrences of the cluster management service is low and further, is not subject to high latencies and/or unreliability of the Internet. Example techniques for cluster bring-up are shown and described as pertains to FIG. 2A and FIG. 2B.

FIG. 2A depicts an example system 2A00 that configures a cluster environment for self-contained bring-up. As an option, one or more variations of example system 2A00 or any aspect thereof may be implemented in the context of the architecture and functionality of the embodiments described herein and/or in any environment.

The figure is being presented to illustrate how bring-up operations are distributed between initiating module 130 and cloud computing infrastructure 103. Specifically, one set of operations are performed by the initiating module 130, whereas another set of operations are performed within the cloud computing infrastructure 103.

In this particular embodiment, operation of the system may commence upon receipt of a client instruction 202. In this embodiment, the client instructions 202 may comprise (1) a request for the initiating module to configure a computing cluster in the cloud computing infrastructure 103, and (2) a general description of the intended configuration of the to-be-configured cluster. Such a request and description might be of the form, "Configure a cluster that has three nodes." Any known techniques can be used to determine the number of nodes. At step 260, a set of nodes are drawn from the cloud infrastructure. In some cases, the initiating module allocates bare-metal nodes of the cloud computing infrastructure. In some cases, the initiating module allocates pre-imaged nodes of the cloud computing infrastructure (e.g., pre-imaged with an operating system, pre-imaged with an operating system and a virtualization system, etc.). The nodes can be allocated using APIs as may be provided by the purveyor of the cloud computing infrastructure. When step 260 completes, an allocated nodes list 138 is provided to downstream processing. In some cases, the exact number of nodes as was requested are allocated. In other cases, any number of additional nodes might be allocated so as to provide fault tolerance. Such fault tolerance is operable during bring-up as well as for ongoing operation. Strictly as one example, if a three node cluster were requested and the business logic expressed "single node fault tolerance," then 4 nodes (=3+1) would be allocated by the initiating module.

The allocated nodes list 138 provides the basis for membership in the to-be-configured cluster. Moreover, in some cases, the nodes list includes a globally-unique member ID. Such a globally-unique member ID can be used to isolate namespaces in the event there are multiple clusters in the environment. Now, given the allocated nodes list 138, step 262 serves to deploy instances of the cluster management service onto the nodes.

This can be accomplished using any known technique. Strictly as one example, the allocated nodes might be delivered by the purveyor of the cloud computing infrastructure as having an operating system pre-installed onto the nodes. This pre-installed operating system might or might not correspond the desired operating system; however, any of such pre-installed operating systems support a mechanism for installing or re-installing software, either on top of or instead of the pre-installed operating system. As such, the operations of 262 that serve to deploy instances of the cluster management service onto the nodes might install any of a suite of virtualization system components on the nodes, either on top of or instead of the pre-installed operating system. As examples, step 262 might install an operating system different from the pre-installed operating system, and then might install a hypervisor, agents, certificates, virtualization system software, etc. Additionally, once the nodes have been initially configured with at least a baseline of the foregoing software, each of the nodes are loaded with node-specific instances of the cluster management service.

The initiating module 130 distributes a per-node instance of cluster management service to each node of the to-be-configured cluster. More specifically, each instance of the cluster management service is configured (1) to receive a cluster specification, which includes the identities of the allocated nodes that will become assigned members of the to-be-configured cluster; (2) to elect an initial leader from among the member of the to-be-configured cluster; (3) to begin autonomous operation upon receipt of a start signal; and (4) to manage self-assembly into a cluster having the specified characteristics.

At this point, the initiating module 130 can disconnect (step 264) from the cloud computing infrastructure 103. As a result of actions of the initiating module, the nodes of the to-be-configured cluster have the needed software resources, license resources, and initial instructions so as to self-assemble among themselves into a cluster that comports with the intended cluster as given in the client instruction 202.

The foregoing initial instructions may include (1) instructions to observe fault tolerance as may be specified in the client instruction 202; (2) instructions to elect a leader from among themselves; (3) instructions that direct the nodes, cooperatively, to carry out cloud infrastructure configuration; and (4) instructions that direct the nodes, cooperatively, to carry out cloud infrastructure configuration.

To explain, for the purpose of electing a leader node from among themselves (step 266), each member of the to-be-configured cluster executes its own instance of the cluster management service. Once a leader is elected, the leader may perform additional operations (step 270) that are included in the leader's instance of the cluster management service so as to manage additional bring-up processing. For example, the leader may self manage bring-up operations from within the cluster, in a manner where members of the cluster cooperatively perform bring-up operations to achieve the intended cluster specification.

Any known technique may be used by the leader node to manage the bring-up process. As one example, the leader node may call a virtualization system API or a virtualization system subroutine to invoke a function of the clustered virtualization environment. Additionally or alternatively the leader node may manage the cluster bring-up process by distributing bring-up instructions to follower nodes. In some cases, the instructions received by the follower nodes are higher-level instructions that are decomposed into lower-level instructions by the follower node(s). The follower nodes may communicate status of instruction to the leader node, and the leader node may remediate in situations where a follower node reports an error condition. It should be noted that, the accomplishment of the foregoing bring-up, did not require resources from outside the cloud provider's infrastructure are needed. The cluster bring-up process is self-managed by the leader node from within the cloud computing infrastructure.

In some cases, the leader may communicate a cluster specification to the follower members of the cluster such that each follower node can independently perform additional bring-up operations. In some cases the leader node and follower node(s) cooperate to configure the cloud provider's networking infrastructure (e.g., switches, routers, router tables, etc.). The configuration of the cloud provider's networking infrastructure serves to accommodate differences between the virtualization system's networking constructs and the actual networking infrastructure of the cloud provider. Strictly as an example, a leader node may initialize actual networking components of the cloud provider by allocating IP addresses from the cloud provider's infrastructure, then may assign the allocated IP addresses to networking interfaces of respective nodes. In some cases routing tables owned by the purveyor of the cloud infrastructure are configured to map MAC addresses to the allocated IP addresses.

At some point, the networking infrastructure portion of the cloud computing infrastructure has been so sufficiently configured that any node of the cluster can carry out network communications with any other node of the intended cluster over the virtualization systems networking constructs. In many cases, the specification of the intended cluster includes a virtualization system that in turn includes a hypervisor and means for executing virtual machines.

Further details regarding general approaches to virtualization system networking components are described in U.S. patent application Ser. No. _____ titled "VIRTUAL MACHINE MIGRATION IN CLOUD INFRASTRUCTURE NETWORKS," filed on Jan. 31, 2020, which is hereby incorporated by reference in its entirety.

Once any node of the cluster can carry out network communications with any other node of the cluster, the cluster is in a condition such that members of the cluster can cooperatively perform any types of bring-up operations so as to achieve the intended cluster specification. Any known technique can be used to cooperatively perform bring-up operations to achieve the intended cluster specification. In one scenario, a series of idempotent operations are carried out such that, when the idempotent operations have been successfully carried out, a cluster having intended cluster specification will have been configured.

Further details regarding general approaches to reaching a specified state by retrying idempotent operations are described in U.S. Pat. No. 10,558,478 titled "SPECIFICATION-BASED COMPUTING SYSTEM CONFIGURATION," filed on Dec. 14, 2017, which is hereby incorporated by reference in its entirety.

When the intended cluster specification has been achieved, the cluster is in a condition to perform a workload (step 272).

Figure 2B:
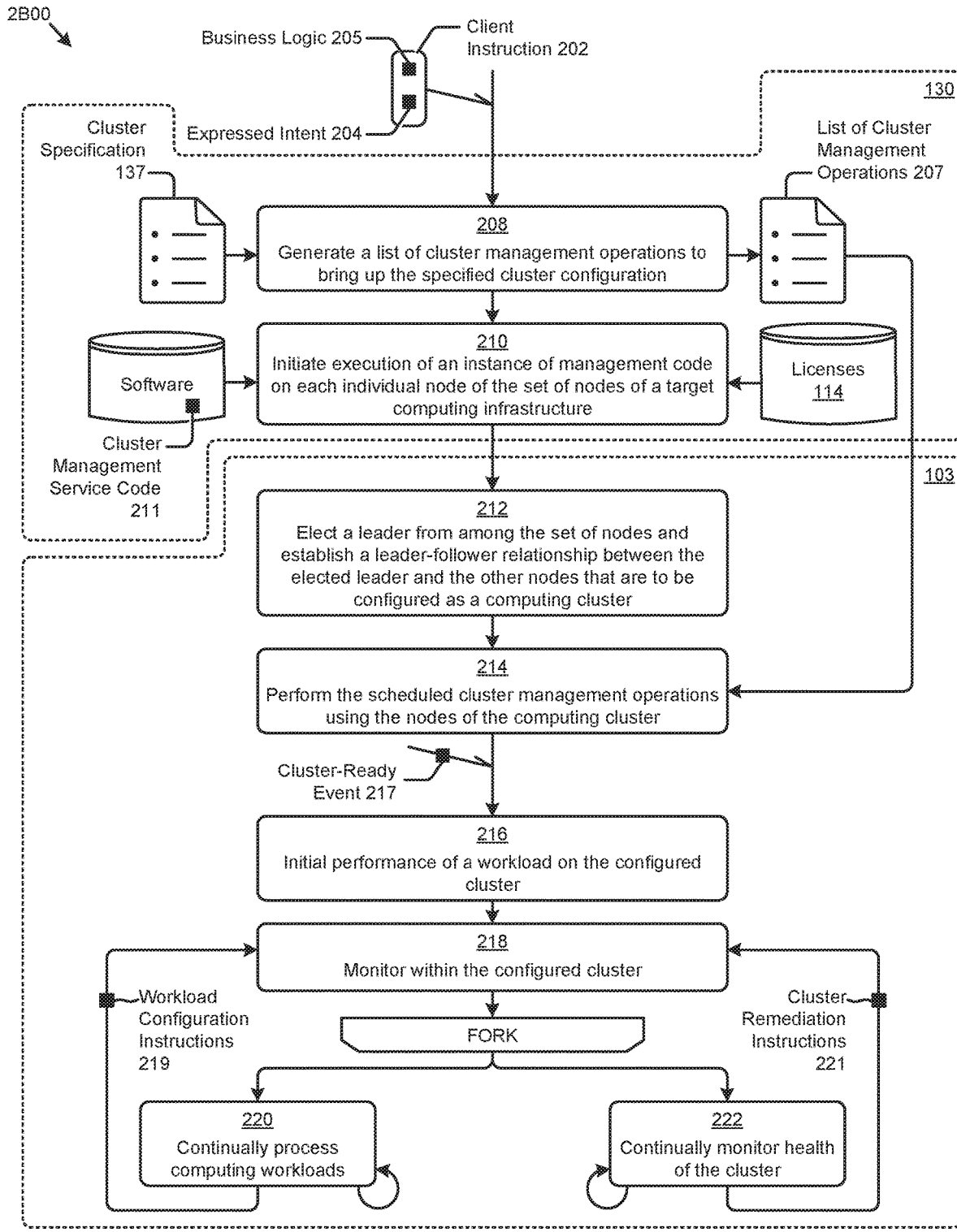
FIG. 2B depicts a bring-up scenario that includes ongoing operations after bring-up while using only intra-footprint resources for ongoing management, according to an embodiment.

FIG. 2B depicts a bring-up scenario 2B00 that includes ongoing operations after bring-up while using only intra-footprint resources for ongoing management. As an option, one or more variations of bring-up scenario 2B00 or any aspect thereof may be implemented in the context of the architecture and functionality of the embodiments described herein and/or in any environment.

The figure is being presented to illustrate how a cluster can be self-configured and brought to an operational state based on a client instruction to configure a cluster having a certain set of specifications. The shown flow through system 200 commences upon detection of client instruction 202. In this embodiment, the client instructions 202 comprise an expressed intent 204 and business logic 205. The expressed intent 204 is considered by the system to be a high-level description of a desired computing cluster, and the business logic 205 is considered by the system to be constraints. Strictly as an illustrative example, the expressed intent might carry the semantics of "Configure a cluster having three nodes, with each of the nodes capable of processing at least 50K database transactions per second," whereas the business logic might express "the replication factor must be at least RF=2."

Given the expressed intent, "Configure a cluster having three nodes, with the three nodes being collectively capable of processing at least 50K database transactions per second," and by using any heuristics or other techniques, the expressed intent can be codified into a cluster specification 137, which is in turn processed, possibly in combination with applicable business logic 205. The intent can be codified into a cluster specification using any known technique that can serve to codify any as aspect of the to-be-configured cluster. For example, a performance-related intent of "must process 50K database transactions per second" might be codified as, "each of three nodes of a cluster are to be selected from nodes that are configured with at least 65 GB of memory and at least 2T of local storage capacity; three licenses to the database server are required." Additionally, the expressed intent and/or the codified cluster specification can be used, singly or in combination, to generate a list of cluster management operations 207 to bring-up the specified cluster (step 208).

Further details regarding general approaches to specifying an intent are described in U.S. Pat. No. 10,558,478 titled "SPECIFICATION-BASED COMPUTING SYSTEM CONFIGURATION," filed on Dec. 14, 2017, which is hereby incorporated by reference in its entirety.

The foregoing list of cluster management operations can be configured into any one or more instances of cluster management service code 211. Moreover, any licenses 114 that are needed for bring-up and operation of the specified cluster are obtained and configured into any one or more instances of the cluster management service code. The shown flow continues at step 210 where each of the configured instances of the cluster management service are loaded onto respective nodes of the to-be-configured cluster. The cluster management service code that is loaded onto the respective nodes can self-invoke. In some cases, and as shown in this particular embodiment, self-invocation results in each node commencing into a protocol to elect a leader (step 212).

One result of carrying out the protocol to elect a leader is to establish a leader-follower relationship among the nodes. Having such a leader-follower relationship facilitates certain types of bring-up operations, including distribution of software modules, time-sharing of licenses, and inter-node distribution of instructions. Moreover, having an established leader-follower relationships between the nodes of the cluster serves for maintaining high availability of the cluster. Specifically, clusters that are deployed in a high availability configuration can be made to be fault tolerant (e.g., tolerant to a single node failure, tolerant to a two node failure), etc. That is, if for some reason a particular node fails, the fault-tolerant configuration of such a high availability cluster is brought to bear. Specifically, in event of a downed cluster node, the instances of cluster management services in the non-failed nodes will organize among themselves remediate the loss of the node. In some situations a leader node can be lost, and in such as case, instances of cluster management services in the non-failed nodes will organize among themselves to choose another node as a leader. The leader then directs operations so as to return the cluster to its high availability, fault tolerant, operational state.

To implement such a fault-tolerant facility, instances of cluster management services are configured to detect changes in the constituency of the cluster and, responsive to such a constituency change, to carry out operations that restore the cluster to a specified target intent. This fault tolerance can be made operable by configuring the management layer (e.g., the code corresponding to an instance of the cluster management service) to be aware of cluster constituency. Strictly as examples, during bring-up of the to-be-configured cluster, the management layer can detect loss of communication with a cluster member, and can remediate such a loss by invoking code that reconfigures the cluster with a replacement member. In various example scenarios, even the leader node of a to-be-configured cluster may fail, and yet, the management layer of a non-failed member can detect the loss of communication with the failed cluster member, and can then remediate that loss by invoking code that reconfigures the cluster with (1) a new leader, and (2) a replacement node to replace the failed node. In still other example scenarios, the management layer can initiate and/or perform fault-tolerance operations that restore the cluster to a specified target intent. Such fault-tolerance operations including adding a node, removing a node, upgrading a node, rebooting a node, etc.

Any known technique or techniques (e.g., Raft, PAXOS, etc.) can be used to establish leader-follower relationships between the nodes. Once the leader-follower relationships have been established, performance of bring-up operations commence (step 214). In some embodiments, the leader directs each follower to perform one or more of the list of cluster management operations 207. In other embodiments, node-specific portions of the list of cluster management operations are apportioned to respective nodes, and each respective node performs its set of bring-up operations.

In some cases, a leader can send a pre-prepared intent specification to each of the follower nodes. Each of the nodes can then reconfigure themselves (e.g., in parallel) and add themselves as members of the cluster in accordance with the pre-prepared intent specification. Cluster membership can be configured independently, node-by-node by each of the follower nodes (e.g., by adding themselves to the cluster) or, each of the follower nodes can coordinate with the leader such that the leader configures the follower nodes into the membership of the cluster. In other cases, nodes can self-include themselves as members of the cluster by entering themselves into a distributed cluster membership record that is maintained within the cluster. It should be noted that once the leader-follower relationships have been established, carrying out instructions such as bring-up instructions and ongoing management instructions can be done in synchronicity between the nodes. Moreover, and as earlier mentioned, since the nodes of the to-be-configured cluster are all situated within the customer's virtual private cloud (e.g., in the same subnet), communication latency between the nodes is low. As such, performance of bring-up instructions and ongoing management instructions can be done in a low latency environment.

At some moment, all of the cluster bring-up operations will have been successfully completed. At that time, and responsive to the occurrence that all of the cluster bring-up operations have been successfully completed, a cluster-ready event 217 is raised and broadcast to all nodes of the cluster. The occurrence of the cluster-ready event serves as a signal to each node that the cluster as a whole is ready to perform workloads (step 216). Such workloads might have been established into the codebase that was loaded into the nodes, or such workloads might be raised from within the cluster.

Step 218 serves to establish monitoring of the configured cluster. Specifically, operations of step 220 serve for continually monitoring the computing workloads, while operations of step 222 serve for monitoring the health of the cluster. The operations of step 220 might emit workload configuration instructions 219 (e.g., load balancing) while the operations of step 222 might emit cluster remediation instructions 221. At this point the cluster is fully configured, fully functional, and is being continually self-monitored for ongoing performance and health considerations.

Figure 3A:
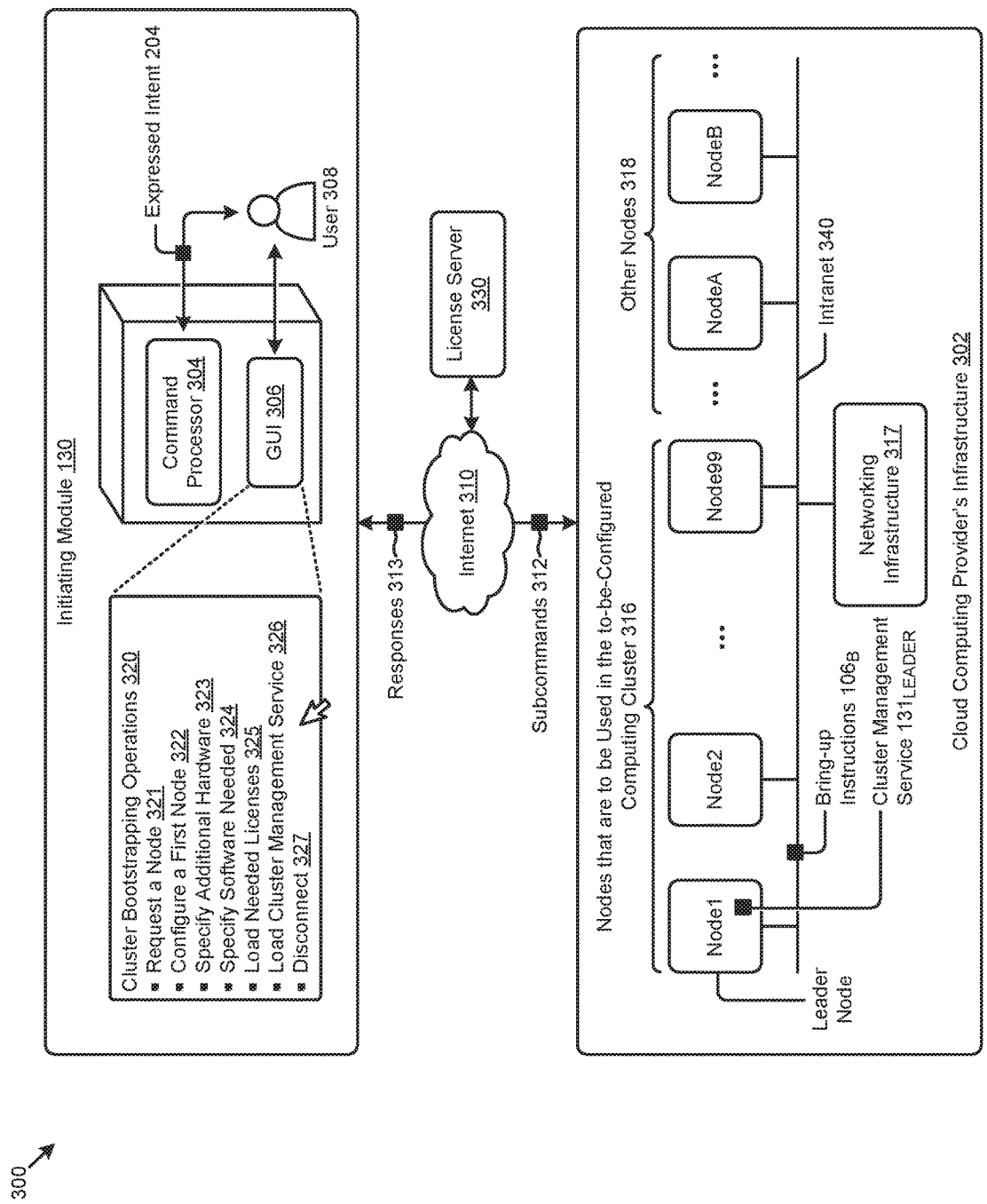
FIG. 3A illustrates a cluster bring-up environment that loads a cluster management service into a first node of a to-be-configured cluster, according to an embodiment.

FIG. 3A illustrates a cluster bring-up environment 300 that loads a cluster management service into a first node of a to-be-configured cluster. As an option, one or more variations of cluster bring-up environment 300 or any aspect thereof may be implemented in the context of the architecture and functionality of the embodiments described herein.

This figure is being presented to illustrate how an initiating module 130 interacts with a user 308 and cloud computing provider's infrastructure 302 over Internet 310. Specifically, the figure depicts how a command processor 304 can break-down an expressed intent 204 into a set of cluster bootstrapping operations that are carried out by the initiating module to establish a management layer that supports self-contained cluster bring-up.

In some embodiments, the initiating module is fully autonomous, while in other embodiments, such as the embodiment of FIG. 3A, the initiating module assists a user in a computer-aided manner. As shown, the command processor is capable of breaking down an expressed intent 204 into a set of cluster bootstrapping operations 320 that are performed prior to commencement of self-contained cluster bring-up. Some or all of the set of cluster bootstrapping operations 320 can be displayed to a user 308 using a graphical user interface (GUI 306). Strictly as an example characteristic of a GUI, a set of cluster bootstrapping operations are presented as an animation during the time that the cluster bootstrapping operations are being performed. In the shown example, the occurrence of the sub-command to request a node 321 might be displayed for a short duration while the cloud computing service is provisioning the requested node. Responses from the cloud computing provider's infrastructure 302 might be displayed as well in the animation. Additionally, the progression of the sub-command to configure a first node 322 might be displayed for a short duration while the requested node is being configured. This progression, together with any animation, may continue for other sub-commands such as to specify additional hardware 323, specify software needed 324, load needed licenses 325, load cluster management service 326, and disconnect 327.

The foregoing sub-commands 312 might be communicated to the cloud computing provider's infrastructure 302 over Internet 310, and responses 313 from the infrastructure provider might be similarly communicated over Internet 310 to the initiating module. Additionally, in some cases such as is shown, a sub-command might check out a license from a license server 330. The shown license server can be located at any secure location that is accessible over the Internet.

The nodes that comprise the self-configured cluster can be selected from an inventory of a particular resource provider (e.g., from an inventory at a cloud-computing provider). In some cases, the resource provider can provide the set of nodes that are to be used in the to-be-configured computing cluster 316 as well as other nodes 318 that are not part of the to-be-configured cluster and, in some such situations, one or more of the other nodes can be configured to provide services (e.g., external object storage) that are not part of the cluster. The nodes of the to-be-configured cluster as well as any other allocated other nodes (e.g., nodeA, nodeB) can be network-wise interconnected over Intranet 340, and/or over any components of networking infrastructure 317.

In this embodiment, the first node of the cluster is configured by the sub-command to configure a first node 322. As shown, the first node (e.g., the shown leader node01) receives a pre-configured instance of a cluster management service (e.g., cluster management service $131_{LEADER}$). This leader node loads the other nodes of the to-be-configured cluster. More specifically, the leader node instantiates a node-specific instance of the cluster management service onto each of the nodes that are to be used in the to-be-configured computing cluster 316. After that, when the leader node broadcasts bring-up instructions 106B over the Intranet, then each of the nodes that are to be used in the to-be-configured computing cluster 316 can respond to the broadcasted instructions. Alternatively or additionally, a leader node can multicast to specific to-be-configured cluster nodes by carrying out a protocol that is implemented within each instance of the cluster management services running on the other to-be-configured cluster nodes.

Figure 3B:
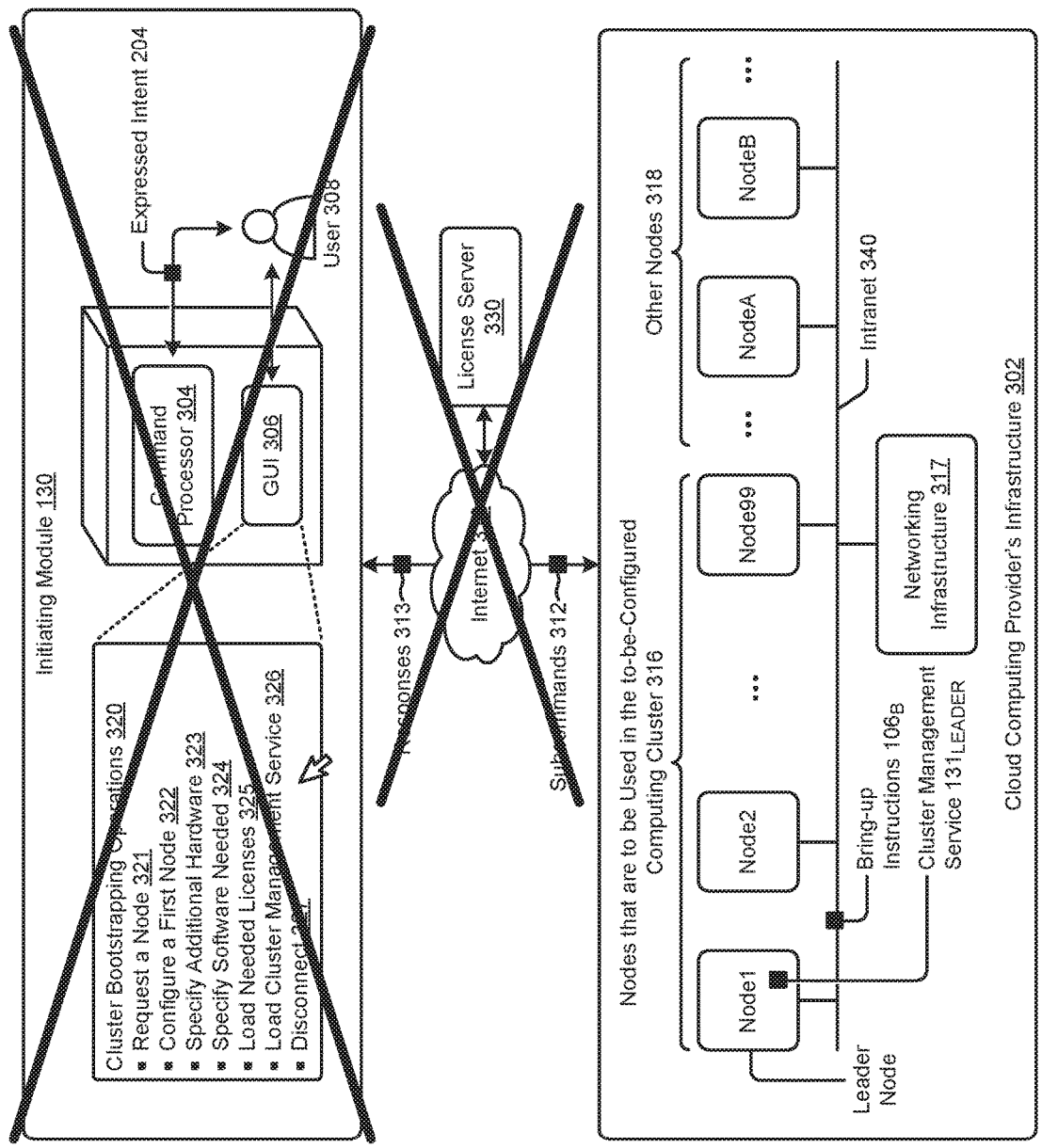
FIG. 3B illustrates that a cluster bring-up can be completed fully within the footprint of a to-be-configured cluster, according to an embodiment.

FIG. 3B illustrates that a cluster bring-up can be completed fully within the footprint of a to-be-configured cluster. Specifically, and as shown, once the initiating module 130 has completed its cluster bootstrapping operations 320 and has disconnected, the initiating module 130 is no longer involved in the cluster bring-up. Moreover, in accordance with embodiments of the present disclosure, the to-be-configured cluster can be brought up using only resources from within the cloud computing infrastructure. This is because the initiating module has configured one or more instances of a cluster management service to include all necessary bring-up instructions, all necessary software components, and all necessary licenses to be able to complete the cluster bring-up using only resources from within the cloud computing infrastructure.

As shown, even after the initiating module has been disconnected, and even if the license server is inaccessible from the cloud computing provider's infrastructure 302, the cluster bring-up can nevertheless be completed.

Figure 4:
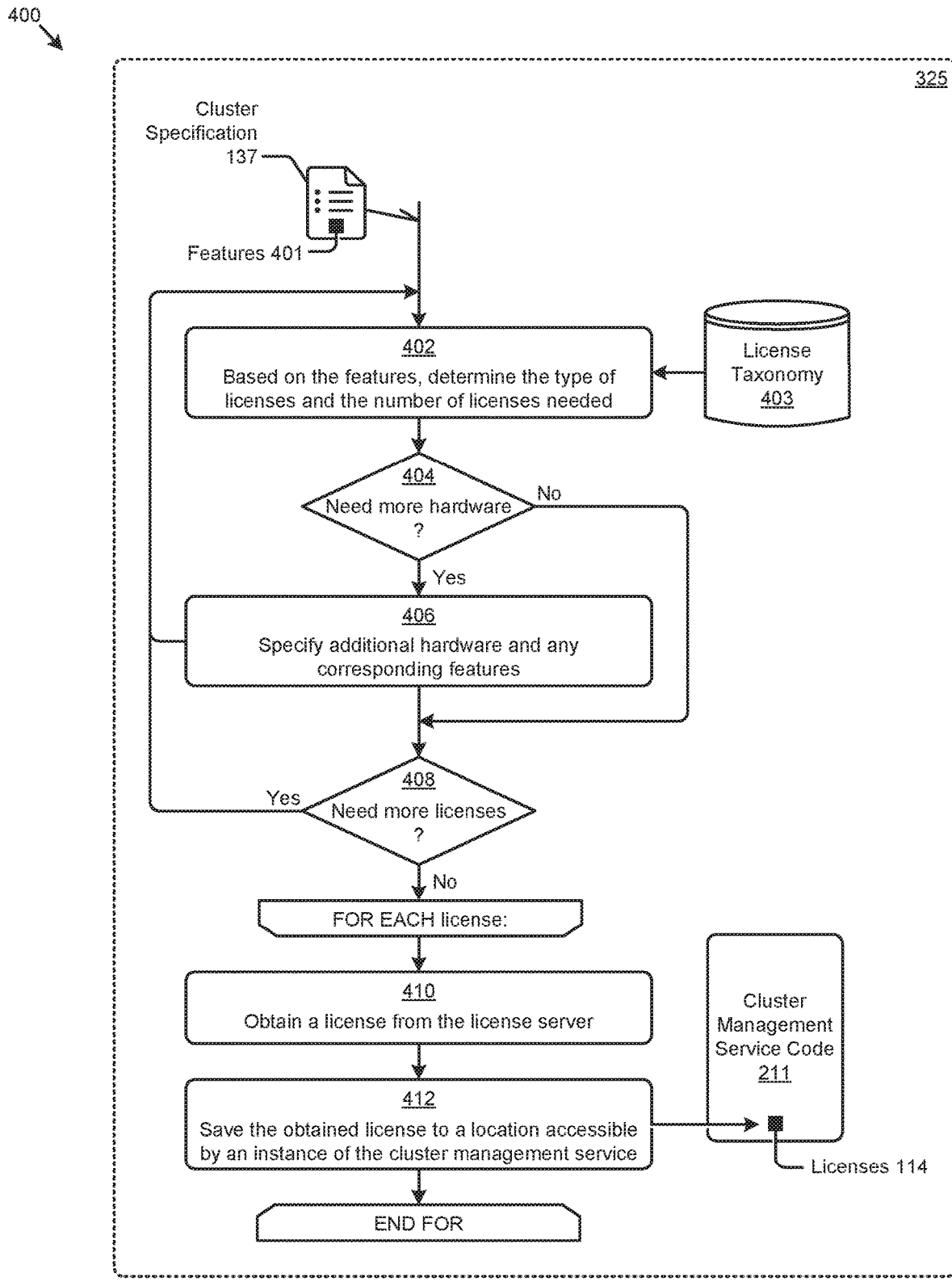
FIG. 4 illustrates an example implementation of a license amalgamator, according to an embodiment.

FIG. 4 illustrates an example implementation of a license amalgamator 400. As an option, one or more variations of license amalgamator 400 or any aspect thereof may be implemented in the context of the architecture and functionality of the embodiments described herein, and/or in any environment.

The figure is being presented to show how a needed set of licenses are identified and made accessible to instances of the cluster management service, even after the initiating module has disconnected and even in the case that the license server becomes unreachable from the cloud computing infrastructure upon which the to-be-configured cluster is to be built. The shown flow of license amalgamator 400 includes consideration for both hardware and software licenses.

The flow is an illustrative implementation of the sub-command to load needed licenses 325. As shown, a cluster specification 137 that includes a set of features 401 are received (step 402) and compared with the contents of a license taxonomy 403 that relates features to licenses. Based on the features, the number and type of licenses are determined. In some cases a feature demands both licenses (e.g., to operate the software corresponding to the feature) as well as additional or specialized hardware. In the case where there is additional hardware needed, the "Yes" branch of decision 404 is taken and step 406 then serves to specify additional hardware and any corresponding additional features. In some cases, the additional hardware needed has prerequisites of additional licenses. If so, the "Yes" branch of decision 408 is taken and the flow goes back the step 402 to (again) determine the number and type of licenses needed.

After traversing through the loop until it is determined that no additional licenses are needed, the "No" branch of decision 408 is taken. Then, for each license needed, step 410 serves to obtain the needed license from a license server (e.g., license server 330 of FIG. 3A), which license is saved (step 412) to a location that is reachable, directly or indirectly, by an instance of cluster management service code 211.

At the conclusion of the loop, all hardware and all licenses needed for bring-up and operation of the to-be-configured cluster have been considered and as such, when the to-be-configured cluster is self-assembling within its own footprint, there is no need to obtain additional licenses.

In addition to bringing the foregoing licenses into the footprint of the to-be-configured cluster, various software components need to be made available for intra-footprint bring-up and ongoing operation of the to-be-configured cluster. One implementation involves configuring needed software components into the codebase of the cluster management service. An example of such an implementation is shown and described as pertains to FIG. 5.

Figure 5:
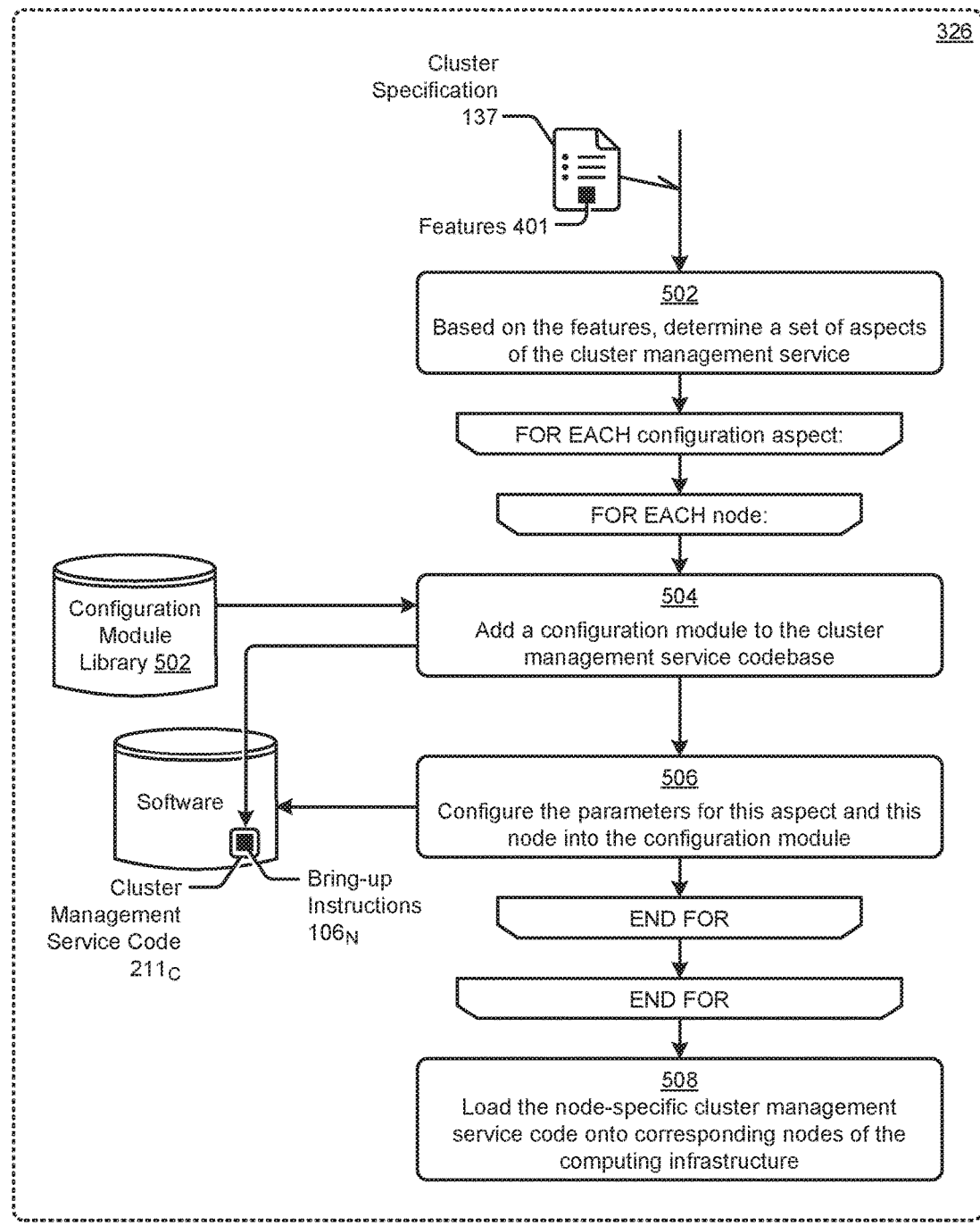
FIG. 5 illustrates an example implementation of a cluster management service module configurator, according to an embodiment.

FIG. 5 illustrates an example implementation of a cluster management service module configurator 500. As an option, one or more variations of cluster management service module configurator 500 or any aspect thereof may be implemented in the context of the architecture and functionality of the embodiments described herein, and/or in any environment.

The figure is being presented to show how a needed set of software modules are identified and made accessible to instances of the cluster management service, even after the initiating module has disconnected from the cloud computing infrastructure upon which the to-be-configured cluster is to be built. The shown flow of cluster management service module configurator 500 includes consideration for feature aspects as they apply to a particular node.

The flow is an illustrative implementation of the cluster management service sub-command. As shown, a cluster specification 137 that includes a set of features 401 are received (step 502). Aspects of the features that would be subject to parameterization are identified. Then, based on the features and corresponding parameterizable aspects, a configuration module is drawn from a configuration module library 502 and added to the cluster management codebase (step 504). A loop is entered such that each node that is to be a member of the to-be-configured cluster is individually considered. Parameter values for a particular feature aspect on a particular node are established into the configured cluster management service code 211c and/or into bring-up instructions $106_N$ (step 506). When the looping is complete, each node-specific instance of the configured cluster management service code 211c is in a condition to be loaded into nodes of the to-be-configured cluster, and step 508 serves to load the node-specific cluster management service code 211c onto corresponding nodes of the cloud computing infrastructure.

Having completed the steps of license amalgamator 400 and having completed the steps of cluster management service module configurator 500, the cluster is ready to begin self-assembly. A start signal is sent to at least one of the nodes of the to-be-configured cluster. The occurrence of the start signal then triggers execution of one or more of the bring-up instructions $106_N$ at any one or more of the nodes of the to-be-configured cluster.

In example embodiments, the bring-up instructions $106_N$ specify one or more idempotent operations. An idempotent operation is an operation that can be performed any number of times and yet achieve in the same result. The operation "set X=0" can be performed any number of times and, if successful, will achieve in the same result, that being that the value of X is zero. Idempotent operations can be used in cluster bring-up. An idempotent operation executor can be included in the cluster management service code 211, possibly together with any number of idempotent bring-up operations. One possible implementation of an idempotent operation executor is shown and described as pertains to FIG. 6.

Figure 6:
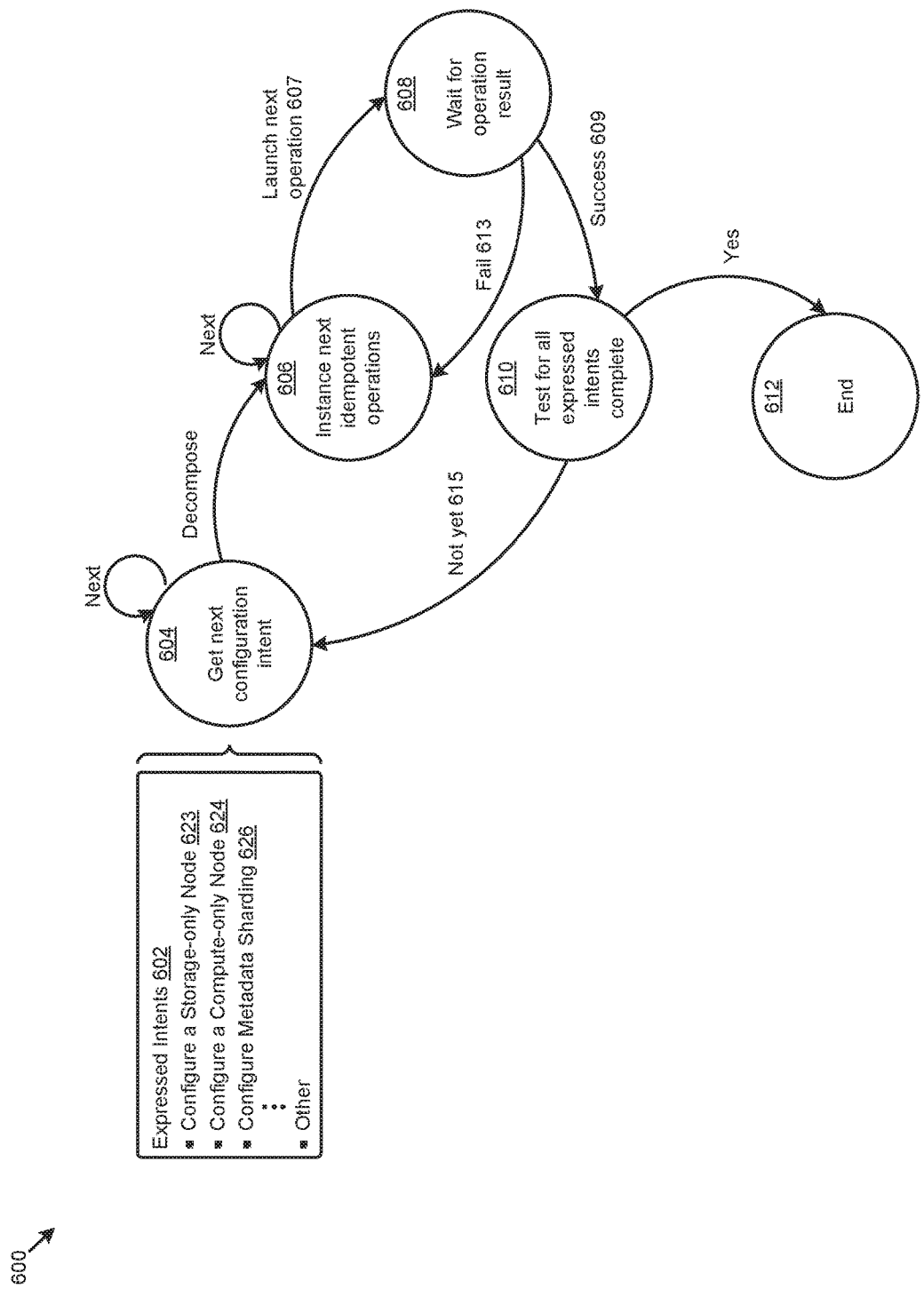
FIG. 6 presents an idempotent operation executor, according to an embodiment.

FIG. 6 presents an idempotent operation executor 600. As an option, one or more variations of idempotent operation executor 600 or any aspect thereof may be implemented in the context of the architecture and functionality of the embodiments described herein, and/or in any environment.

In the context of a computing cluster bring-up, any number of intents (e.g., expressed intents 602) can be codified in bring-up instructions $106_N$ and/or in node-specific cluster management service code 211. Strictly as examples, expressed intents for cluster bring-up might include an expressed intent to configure a storage only node (intent 623), an expressed intent to configure a compute-only node (intent 624), an expressed intent to configure metadata sharding (intent 626) as well as other expressed intents. Each of the foregoing expressed intents can be decomposed into a set of idempotent operations. The set of idempotent operations can then be carried out any number of times until the expressed intent is achieved. More specifically, since these are idempotent operations, even in the case that an idempotent operation fails, it can be repeated at a later time and/or under a different set of conditions, at which time, or under which different set of conditions the idempotent operation may succeed. When all idempotent operations that correspond to an expressed intent have succeeded, the expressed intent is deemed to have been achieved.

Further details regarding general approaches to decomposing an expressed intent into idempotent operations are described in U.S. Pat. No. 10,558,478 titled "SPECIFICATION-BASED COMPUTING SYSTEM CONFIGURATION," filed on Dec. 14, 2017, which is hereby incorporated by reference in its entirety.

As shown the idempotent operation executor 600 commences at state 604. A set of expressed intents 602 includes several specific configuration intents, which can be accessed when state 604 is entered. The particular next expressed intent is decomposed into idempotent operations, successive ones of which are instanced (state 606). Each of the next idempotent operations are launched (event 607) and a corresponding wait state 608 is entered to wait for a success or failure or time-out of the idempotent operation. In event of a fail (event 613) the idempotent operation is retried. In event of success (event 609) any number of tests are carried out to check whether all expressed intents have been achieved (state 610). If fewer than all expressed intents have been achieved, then the "not yet" event 615 is raised and processing continues. On the other hand, if all expressed intents have been achieved, then all configuration intents have been achieved and the idempotent operation executor 600 can end (state 612) until such time as newly-incoming expressed intents are raised.

In some embodiments, the foregoing idempotent operation executor 600 is implemented within software modules that are included in the nodes of the to-be-configured cluster. In such a case, an initiating module (e.g., initiating module 130 of FIG. 1B) need only provide a single expressed intent (e.g., "configure a three node cluster"). The cluster bring-up can be accomplished without need for additional instructions.

Additionally or alternatively, the foregoing idempotent operation executor 600 is implemented within an agent that is accessible by the nodes of the to-be-configured cluster. Furthermore, additionally or alternatively, the foregoing idempotent operation executor 600 can be implemented within an agent that is situated outside of a private subnet of the to-be-configured cluster (e.g., outside of the cluster footprint $101_{INTRA}$ of FIG. 1B). In such cases the agent is accessible by the nodes of the to-be-configured cluster over a network.

In still further embodiments the expressed intents may include an intent such as "Obtain licenses for configured-in features." In such cases, the foregoing agent and/or a license server (e.g., license server 330 of FIG. 3A) is accessible by the nodes of the to-be-configured cluster over a network.

System Architecture Overview

All or portions of any of the foregoing techniques can be partitioned into one or more modules and instanced within, or as, or in conjunction with a virtualized controller in a virtual computing environment. Some example instances within various virtual computing environments are shown and discussed as pertains to FIG. 7A, FIG. 7B, FIG. 7C, and FIG. 7D.

Figure 7A:
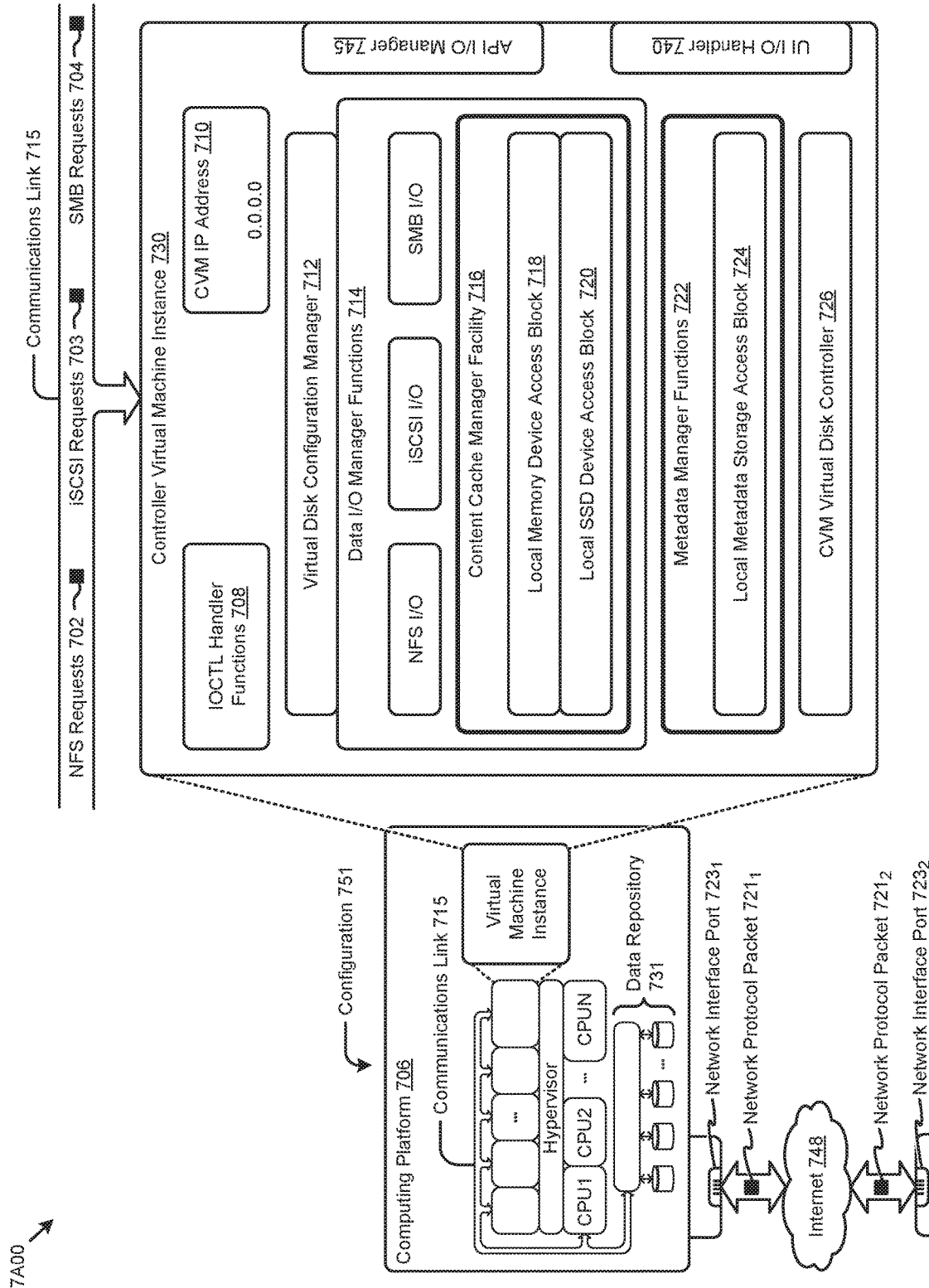
FIG. 7A, FIG. 7B, FIG. 7C, and FIG. 7D depict virtualization system architectures comprising collections of interconnected components suitable for implementing embodiments of the present disclosure and/or for use in the herein-described environments.

FIG. 7A depicts a virtualized controller as implemented in the shown virtual machine architecture 7A00. The heretofore-disclosed embodiments, including variations of any virtualized controllers, can be implemented in distributed systems where a plurality of networked-connected devices communicate and coordinate actions using inter-component messaging.

As used in these embodiments, a virtualized controller is a collection of software instructions that serve to abstract details of underlying hardware or software components from one or more higher-level processing entities. A virtualized controller can be implemented as a virtual machine, as an executable container, or within a layer (e.g., such as a layer in a hypervisor). Furthermore, as used in these embodiments, distributed systems are collections of interconnected components that are designed for, or dedicated to, storage operations as well as being designed for, or dedicated to, computing and/or networking operations.

Interconnected components in a distributed system can operate cooperatively to achieve a particular objective such as to provide high-performance computing, high-performance networking capabilities, and/or high-performance storage and/or high-capacity storage capabilities. For example, a first set of components of a distributed computing system can coordinate to efficiently use a set of computational or compute resources, while a second set of components of the same distributed computing system can coordinate to efficiently use the same or a different set of data storage facilities.

A hyperconverged system coordinates the efficient use of compute and storage resources by and between the components of the distributed system. Adding a hyperconverged unit to a hyperconverged system expands the system in multiple dimensions. As an example, adding a hyperconverged unit to a hyperconverged system can expand the system in the dimension of storage capacity while concurrently expanding the system in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as executable containers. In some systems and/or environments, hypervisor-assisted virtualization techniques and operating system virtualization techniques are combined.

As shown, virtual machine architecture 7A00 comprises a collection of interconnected components suitable for implementing embodiments of the present disclosure and/or for use in the herein-described environments. Moreover, virtual machine architecture 7A00 includes a virtual machine instance in configuration 751 that is further described as pertaining to controller virtual machine instance 730. Configuration 751 supports virtual machine instances that are deployed as user virtual machines, or controller virtual machines or both. Such virtual machines interface with a hypervisor (as shown). Some virtual machines include processing of storage I/O (input/output or IO) as received from any or every source within the computing platform. An example implementation of such a virtual machine that processes storage I/O is depicted as 730.

In this and other configurations, a controller virtual machine instance receives block I/O storage requests as network file system (NFS) requests in the form of NFS requests 702, and/or internet small computer storage interface (iSCSI) block IO requests in the form of iSCSI requests 703, and/or Samba file system (SMB) requests in the form of SMB requests 704. The controller virtual machine (CVM) instance publishes and responds to an internet protocol (IP) address (e.g., CVM IP address 710). Various forms of input and output can be handled by one or more IO control handler functions (e.g., IOCTL handler functions 708) that interface to other functions such as data IO manager functions 714 and/or metadata manager functions 722. As shown, the data IO manager functions can include communication with virtual disk configuration manager 712 and/or can include direct or indirect communication with any of various block IO functions (e.g., NFS IO, iSCSI IO, SMB IO, etc.).

In addition to block IO functions, configuration 751 supports IO of any form (e.g., block IO, streaming IO, packet-based IO, HTTP traffic, etc.) through either or both of a user interface (UI) handler such as UI IO handler 740 and/or through any of a range of application programming interfaces (APIs), possibly through API IO manager 745.

Communications link 715 can be configured to transmit (e.g., send, receive, signal, etc.) any type of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases, the payload comprises a data structure that is encoded and/or formatted to fit into byte or word boundaries of the packet.

In some embodiments, hard-wired circuitry may be used in place of, or in combination with, software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as hard disk drives (HDDs) or hybrid disk drives, or random access persistent memories (RAPMs) or optical or magnetic media drives such as paper tape or magnetic tape drives. Volatile media includes dynamic memory such as random access memory. As shown, controller virtual machine instance 730 includes content cache manager facility 716 that accesses storage locations, possibly including local dynamic random access memory (DRAM) (e.g., through local memory device access block 718) and/or possibly including accesses to local solid state storage (e.g., through local SSD device access block 720).

Common forms of computer readable media include any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of data repository 731, which in turn can be formatted into any one or more storage areas, and which can comprise parameterized storage accessible by a key (e.g., a filename, a table name, a block address, an offset address, etc.). Data repository 731 can store any forms of data, and may comprise a storage area dedicated to storage of metadata pertaining to the stored forms of data. In some cases, metadata can be divided into portions. Such portions and/or cache copies can be stored in the storage data repository and/or in a local storage area (e.g., in local DRAM areas and/or in local SSD areas). Such local storage can be accessed using functions provided by local metadata storage access block 724. The data repository 731 can be configured using CVM virtual disk controller 726, which can in turn manage any number or any configuration of virtual disks.

Execution of a sequence of instructions to practice certain embodiments of the disclosure are performed by one or more instances of a software instruction processor, or a processing element such as a data processor, or such as a central processing unit (e.g., CPU1, CPU2, . . . , CPUN). According to certain embodiments of the disclosure, two or more instances of configuration 751 can be coupled by communications link 715 (e.g., backplane, LAN, PSTN, wired or wireless network, etc.) and each instance may perform respective portions of sequences of instructions as may be required to practice embodiments of the disclosure.

The shown computing platform 706 is interconnected to the Internet 748 through one or more network interface ports (e.g., network interface port 7231 and network interface port 7232). Configuration 751 can be addressed through one or more network interface ports using an IP address. Any operational element within computing platform 706 can perform sending and receiving operations using any of a range of network protocols, possibly including network protocols that send and receive packets (e.g., network protocol packet 7211 and network protocol packet 7212).

Computing platform 706 may transmit and receive messages that can be composed of configuration data and/or any other forms of data and/or instructions organized into a data structure (e.g., communications packets). In some cases, the data structure includes program instructions (e.g., application code) communicated through the Internet 748 and/or through any one or more instances of communications link 715. Received program instructions may be processed and/or executed by a CPU as it is received and/or program instructions may be stored in any volatile or non-volatile storage for later execution. Program instructions can be transmitted via an upload (e.g., an upload from an access device over the Internet 748 to computing platform 706). Further, program instructions and/or the results of executing program instructions can be delivered to a particular user via a download (e.g., a download from computing platform 706 over the Internet 748 to an access device).

Configuration 751 is merely one sample configuration. Other configurations or partitions can include further data processors, and/or multiple communications interfaces, and/or multiple storage devices, etc. within a partition. For example, a partition can bound a multi-core processor (e.g., possibly including embedded or collocated memory), or a partition can bound a computing cluster having a plurality of computing elements, any of which computing elements are connected directly or indirectly to a communications link. A first partition can be configured to communicate to a second partition. A particular first partition and a particular second partition can be congruent (e.g., in a processing element array) or can be different (e.g., comprising disjoint sets of components).

A cluster is often embodied as a collection of computing nodes that can communicate between each other through a local area network (e.g., LAN or virtual LAN (VLAN)) or a backplane. Some clusters are characterized by assignment of a particular set of the aforementioned computing nodes to access a shared storage facility that is also configured to communicate over the local area network or backplane. In many cases, the physical bounds of a cluster are defined by a mechanical structure such as a cabinet or such as a chassis or rack that hosts a finite number of mounted-in computing units. A computing unit in a rack can take on a role as a server, or as a storage unit, or as a networking unit, or any combination therefrom. In some cases, a unit in a rack is dedicated to provisioning of power to other units. In some cases, a unit in a rack is dedicated to environmental conditioning functions such as filtering and movement of air through the rack and/or temperature control for the rack. Racks can be combined to form larger clusters. For example, the LAN of a first rack having a quantity of 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or a LAN (e.g., when geographically proximal).

As used herein, a module can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to facilitate operational and/or performance characteristics pertaining to deploying a cluster management service into a node of a to-be-configured computing cluster such that remaining cluster bring-up operations can be performed within the cluster's own footprint. In some embodiments, a module may include one or more state machines and/or combinational logic used to implement or facilitate the operational and/or performance characteristics pertaining to deploying a cluster management service into a node of a to-be-configured computing cluster such that remaining cluster bring-up operations can be performed within the cluster's own footprint.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of deploying a cluster management service into a node of a to-be-configured computing cluster such that remaining cluster bring-up operations can be performed within the cluster's own footprint). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to deploying a cluster management service into a node of a to-be-configured computing cluster such that remaining cluster bring-up operations can be performed within the cluster's own footprint, and/or for improving the way data is manipulated when performing computerized operations pertaining to loading instances of cluster management code into the nodes of a to-be-configured computing cluster.

Further details regarding general approaches to managing data repositories are described in U.S. Pat. No. 8,601,473 titled "ARCHITECTURE FOR MANAGING I/O AND STORAGE FOR A VIRTUALIZATION ENVIRONMENT," issued on Dec. 3, 2013, which is hereby incorporated by reference in its entirety.

Further details regarding general approaches to managing and maintaining data in data repositories are described in U.S. Pat. No. 8,549,518 titled "METHOD AND SYSTEM FOR IMPLEMENTING A MAINTENANCE SERVICE FOR MANAGING I/O AND STORAGE FOR A VIRTUALIZATION ENVIRONMENT," issued on Oct. 1, 2013, which is hereby incorporated by reference in its entirety.

Figure 7B:
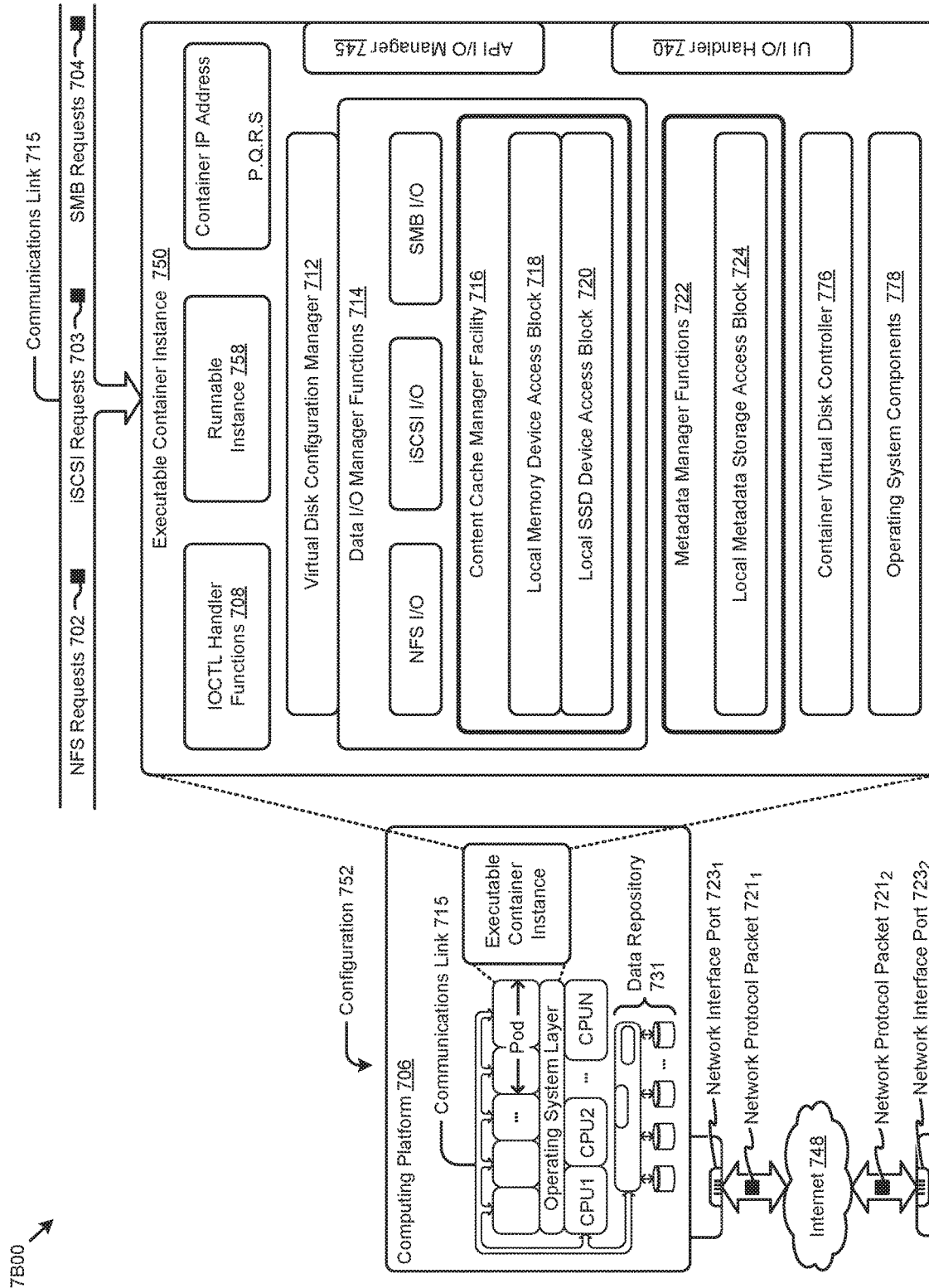

FIG. 7B depicts a virtualized controller implemented by containerized architecture 7B00. The containerized architecture comprises a collection of interconnected components suitable for implementing embodiments of the present disclosure and/or for use in the herein-described environments. Moreover, the shown containerized architecture 7B00 includes an executable container instance in configuration 752 that is further described as pertaining to executable container instance 750. Configuration 752 includes an operating system layer (as shown) that performs addressing functions such as providing access to external requestors (e.g., user virtual machines or other processes) via an IP address (e.g., "P.Q.R.S" as shown). Providing access to external requestors can include implementing all or portions of a protocol specification (e.g., "http:") and possibly handling port-specific functions. In this and other embodiments, external requestors (e.g., user virtual machines or other processes) rely on the aforementioned addressing functions to access a virtualized controller for performing all data storage functions. Furthermore, when data input or output requests are received from a requestor running on a first node are received at the virtualized controller on that first node, then in the event that the requested data is located on a second node, the virtualized controller on the first node accesses the requested data by forwarding the request to the virtualized controller running at the second node. In some cases, a particular input or output request might be forwarded again (e.g., an additional or Nth time) to further nodes. As such, when responding to an input or output request, a first virtualized controller on the first node might communicate with a second virtualized controller on the second node, which second node has access to particular storage devices on the second node or, the virtualized controller on the first node may communicate directly with storage devices on the second node.

The operating system layer can perform port forwarding to any executable container (e.g., executable container instance 750). An executable container instance can be executed by a processor. Runnable portions of an executable container instance sometimes derive from an executable container image, which in turn might include all, or portions of any of, a Java archive repository (JAR) and/or its contents, and/or a script or scripts and/or a directory of scripts, and/or a virtual machine configuration, and may include any dependencies therefrom. In some cases, a configuration within an executable container might include an image comprising a minimum set of runnable code. Contents of larger libraries and/or code or data that would not be accessed during runtime of the executable container instance can be omitted from the larger library to form a smaller library composed of only the code or data that would be accessed during runtime of the executable container instance. In some cases, start-up time for an executable container instance can be much faster than start-up time for a virtual machine instance, at least inasmuch as the executable container image might be much smaller than a respective virtual machine instance. Furthermore, start-up time for an executable container instance can be much faster than start-up time for a virtual machine instance, at least inasmuch as the executable container image might have many fewer code and/or data initialization steps to perform than a respective virtual machine instance.

An executable container instance can serve as an instance of an application container or as a controller executable container. Any executable container of any sort can be rooted in a directory system and can be configured to be accessed by file system commands (e.g., "ls" or "ls-a," etc.). The executable container might optionally include operating system components 778, however such a separate set of operating system components need not be provided. As an alternative, an executable container can include runnable instance 758, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, container virtual disk controller 776. Such a container virtual disk controller can perform any of the functions that the aforementioned CVM virtual disk controller 726 can perform, yet such a container virtual disk controller does not rely on a hypervisor or any particular operating system so as to perform its range of functions.

In some environments, multiple executable containers can be collocated and/or can share one or more contexts. For example, multiple executable containers that share access to a virtual disk can be assembled into a pod (e.g., a Kubernetes pod). Pods provide sharing mechanisms (e.g., when multiple executable containers are amalgamated into the scope of a pod) as well as isolation mechanisms (e.g., such that the namespace scope of one pod does not share the namespace scope of another pod).

Figure 7C:
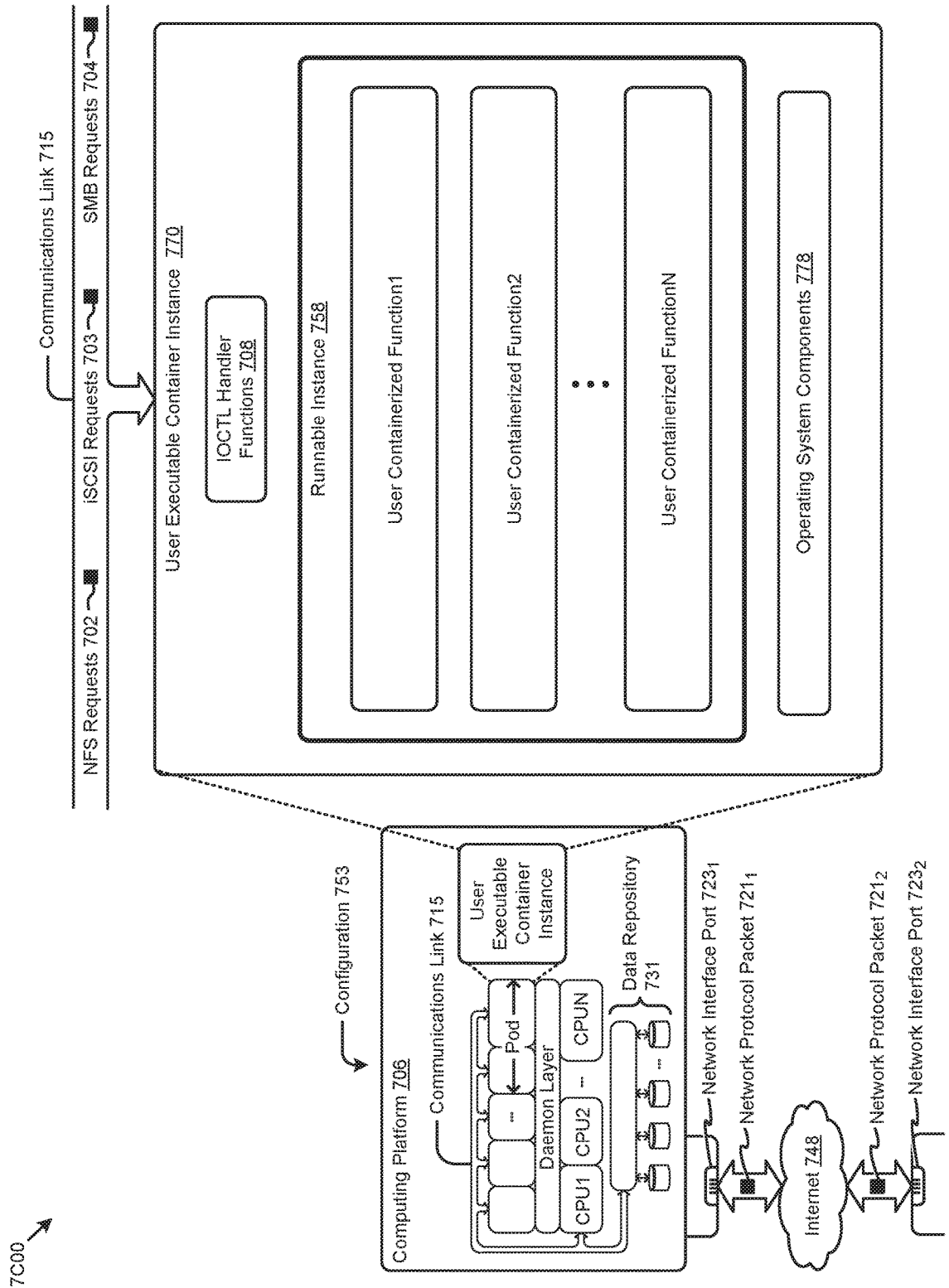

FIG. 7C depicts a virtualized controller implemented by a daemon-assisted containerized architecture 7C00. The containerized architecture comprises a collection of interconnected components suitable for implementing embodiments of the present disclosure and/or for use in the herein-described environments. Moreover, the shown daemon-assisted containerized architecture includes a user executable container instance in configuration 753 that is further described as pertaining to user executable container instance 770. Configuration 753 includes a daemon layer (as shown) that performs certain functions of an operating system.

User executable container instance 770 comprises any number of user containerized functions (e.g., user containerized function1, user containerized function2, . . . , user containerized functionN). Such user containerized functions can execute autonomously or can be interfaced with or wrapped in a runnable object to create a runnable instance (e.g., runnable instance 758). In some cases, the shown operating system components 778 comprise portions of an operating system, which portions are interfaced with or included in the runnable instance and/or any user containerized functions. In this embodiment of a daemon-assisted containerized architecture, the computing platform 706 might or might not host operating system components other than operating system components 778. More specifically, the shown daemon might or might not host operating system components other than operating system components 778 of user executable container instance 770.

The virtual machine architecture 7A00 of FIG. 7A and/or the containerized architecture 7B00 of FIG. 7B and/or the daemon-assisted containerized architecture 7C00 of FIG. 7C can be used in any combination to implement a distributed platform that contains multiple servers and/or nodes that manage multiple tiers of storage where the tiers of storage might be formed using the shown data repository 731 and/or any forms of network accessible storage. As such, the multiple tiers of storage may include storage that is accessible over communications link 715. Such network accessible storage may include cloud storage or networked storage (e.g., a SAN or storage area network). Unlike prior approaches, the presently-discussed embodiments permit local storage that is within or directly attached to the server or node to be managed as part of a storage pool. Such local storage can include any combinations of the aforementioned SSDs and/or HDDs and/or RAPMs and/or hybrid disk drives. The address spaces of a plurality of storage devices, including both local storage (e.g., using node-internal storage devices) and any forms of network-accessible storage, are collected to form a storage pool having a contiguous address space.

Significant performance advantages can be gained by allowing the virtualization system to access and utilize local (e.g., node-internal) storage. This is because I/O performance is typically much faster when performing access to local storage as compared to performing access to networked storage or cloud storage. This faster performance for locally attached storage can be increased even further by using certain types of optimized local storage devices such as SSDs or RAPMs, or hybrid HDDs, or other types of high-performance storage devices.

In example embodiments, each storage controller exports one or more block devices or NFS or iSCSI targets that appear as disks to user virtual machines or user executable containers. These disks are virtual since they are implemented by the software running inside the storage controllers. Thus, to the user virtual machines or user executable containers, the storage controllers appear to be exporting a clustered storage appliance that contains some disks. User data (including operating system components) in the user virtual machines resides on these virtual disks.

Any one or more of the aforementioned virtual disks (or "vDisks") can be structured from any one or more of the storage devices in the storage pool. As used herein, the term "vDisk" refers to a storage abstraction that is exposed by a controller virtual machine or container to be used by another virtual machine or container. In some embodiments, the vDisk is exposed by operation of a storage protocol such as iSCSI or NFS or SMB. In some embodiments, a vDisk is mountable. In some embodiments, a vDisk is mounted as a virtual storage device.

In example embodiments, some or all of the servers or nodes run virtualization software. Such virtualization software might include a hypervisor (e.g., as shown in configuration 751 of FIG. 7A) to manage the interactions between the underlying hardware and user virtual machines or containers that run client software.

Distinct from user virtual machines or user executable containers, a special controller virtual machine (e.g., as depicted by controller virtual machine instance 730) or as a special controller executable container is used to manage certain storage and I/O activities. Such a special controller virtual machine is referred to as a "CVM," or as a controller executable container, or as a service virtual machine (SVM), or as a service executable container, or as a storage controller. In some embodiments, multiple storage controllers are hosted by multiple nodes. Such storage controllers coordinate within a computing system to form a computing cluster.

The storage controllers are not formed as part of specific implementations of hypervisors. Instead, the storage controllers run above hypervisors on the various nodes and work together to form a distributed system that manages all of the storage resources, including the locally attached storage, the networked storage, and the cloud storage. In example embodiments, the storage controllers run as special virtual machines—above the hypervisors—thus, the approach of using such special virtual machines can be used and implemented within any virtual machine architecture. Furthermore, the storage controllers can be used in conjunction with any hypervisor from any virtualization vendor and/or implemented using any combinations or variations of the aforementioned executable containers in conjunction with any host operating system components.

Figure 7D:
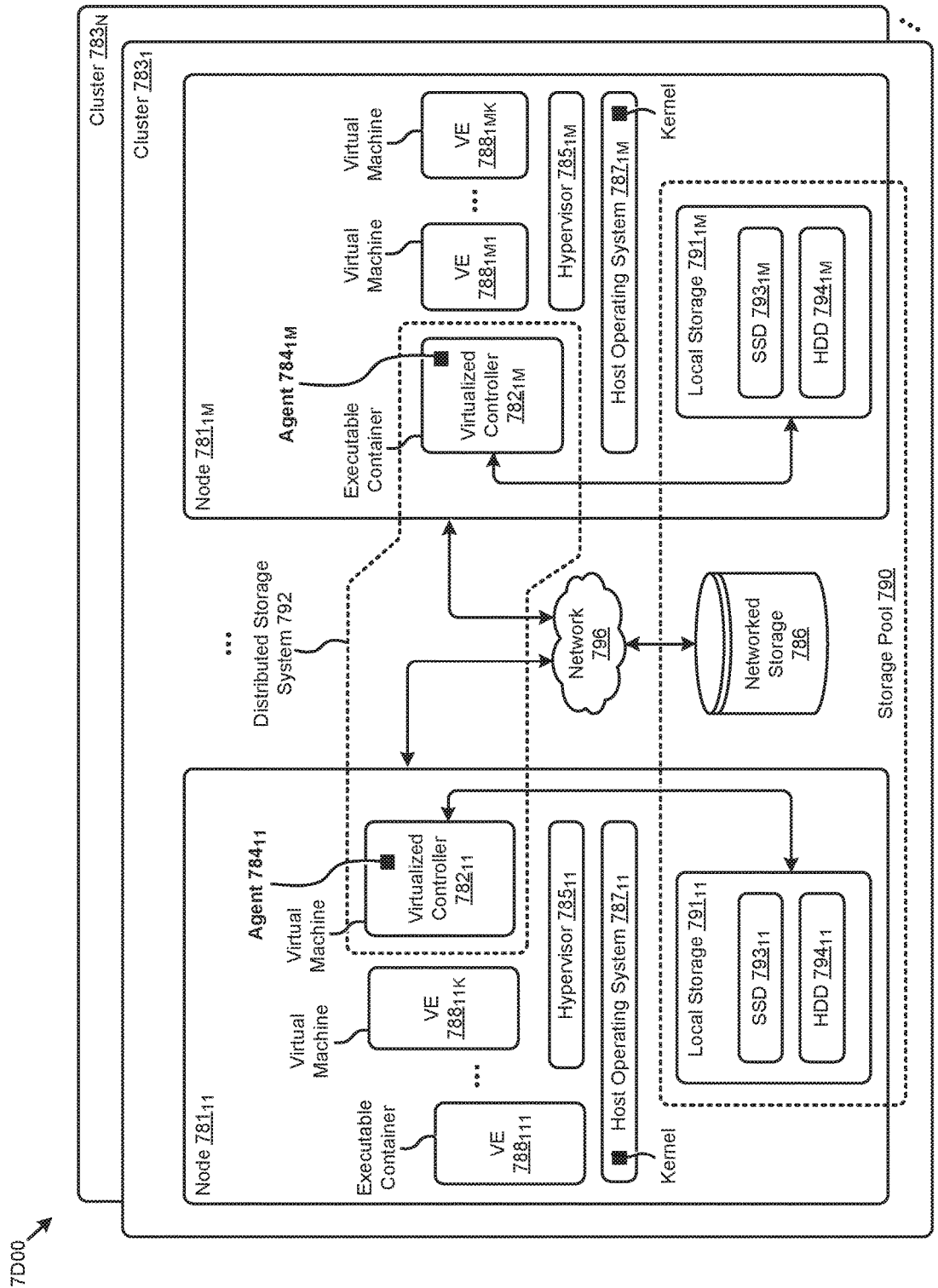

FIG. 7D depicts a distributed virtualization system in a multi-cluster environment 7D00. The shown distributed virtualization system is configured to be used to implement the herein disclosed techniques. Specifically, the distributed virtualization system of FIG. 7D comprises multiple clusters (e.g., cluster $783_1$, . . . , cluster $783_N$) comprising multiple nodes that have multiple tiers of storage in a storage pool. Representative nodes (e.g., node $78_{11}$, . . . , node $781_{IM}$) and storage pool 790 associated with cluster $783_1$ are shown. Each node can be associated with one server, multiple servers, or portions of a server. The nodes can be associated (e.g., logically and/or physically) with the clusters. As shown, the multiple tiers of storage include storage that is accessible through a network 796, such as a networked storage 786 (e.g., a storage area network or SAN, network attached storage or NAS, etc.). The multiple tiers of storage further include instances of local storage (e.g., local storage $791_{11}$, . . . , local storage $791_{IM}$). For example, the local storage can be within or directly attached to a server and/or appliance associated with the nodes. Such local storage can include solid state drives (SSD $793_{11}$, . . . , SSD $793_{IM}$), hard disk drives (HDD $794_{11}$, . . . , HDD $794_{IM}$), and/or other storage devices.

As shown, any of the nodes of the distributed virtualization system can implement one or more user virtualized entities (e.g., VE $788_{111}$, . . . , VE $788_{11K}$, . . . , VE $788_{1M1}$, . . . , VE $788_{1MK}$), such as virtual machines (VMs) and/or executable containers. The VMs can be characterized as software-based computing "machines" implemented in a container-based or hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $787_{11}$, . . . , host operating system $787_{1M}$), while the VMs run multiple applications on various respective guest operating systems. Such flexibility can be facilitated at least in part by a hypervisor (e.g., hypervisor $785_{11}$, . . . , hypervisor $785_{1M}$), which hypervisor is logically located between the various guest operating systems of the VMs and the host operating system of the physical infrastructure (e.g., node).

As an alternative, executable containers may be implemented at the nodes in an operating system-based virtualization environment or in a containerized virtualization environment. The executable containers are implemented at the nodes in an operating system virtualization environment or container virtualization environment. The executable containers comprise groups of processes and/or resources (e.g., memory, CPU, disk, etc.) that are isolated from the node host computer and other containers. Such executable containers directly interface with the kernel of the host operating system (e.g., host operating system $787_{11}$, . . . , host operating system $787_{1M}$) without, in most cases, a hypervisor layer. This lightweight implementation can facilitate efficient distribution of certain software components, such as applications or services (e.g., micro-services). Any node of a distributed virtualization system can implement both a hypervisor-assisted virtualization environment and a container virtualization environment for various purposes. Also, any node of a distributed virtualization system can implement any one or more types of the foregoing virtualized controllers so as to facilitate access to storage pool 790 by the VMs and/or the executable containers.

Multiple instances of such virtualized controllers can coordinate within a cluster to form the distributed storage system 792 which can, among other operations, manage the storage pool 790. This architecture further facilitates efficient scaling in multiple dimensions (e.g., in a dimension of computing power, in a dimension of storage space, in a dimension of network bandwidth, etc.).

A particularly-configured instance of a virtual machine at a given node can be used as a virtualized controller in a hypervisor-assisted virtualization environment to manage storage and I/O (input/output or IO) activities of any number or form of virtualized entities. For example, the virtualized entities at node $781_{11}$ can interface with a controller virtual machine (e.g., virtualized controller $782_{11}$) through hypervisor $785_{11}$ to access data of storage pool 790. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 792. For example, a hypervisor at one node in the distributed storage system 792 might correspond to software from a first vendor, and a hypervisor at another node in the distributed storage system 792 might correspond to a second software vendor. As another virtualized controller implementation example, executable containers can be used to implement a virtualized controller (e.g., virtualized controller $782_{1M}$) in an operating system virtualization environment at a given node. In this case, for example, the virtualized entities at node 781$_{1M}$ can access the storage pool 790 by interfacing with a controller container (e.g., virtualized controller 782$_{1M}$) through hypervisor 785$_{1M}$ and/or the kernel of host operating system 787$_{1M}$.

In certain embodiments, one or more instances of an agent can be implemented in the distributed storage system 792 to facilitate the herein disclosed techniques. Specifically, agent 784$ii$ can be implemented in the virtualized controller 782$_{11}$, and agent 784$_{1M}$ can be implemented in the virtualized controller 782$_{1M}$. Such instances of the virtualized controller can be implemented in any node in any cluster. Actions taken by one or more instances of the virtualized controller can apply to a node (or between nodes), and/or to a cluster (or between clusters), and/or between any resources or subsystems accessible by the virtualized controller or their agents.

Solutions pertaining to loading instances of cluster management code into the nodes of a to-be-configured computing cluster can be brought to bear through implementation of any one or more of the foregoing embodiments. Moreover, any aspect or aspects of how to perform cluster bring-up operations without requiring resources other than those resources provided by the cluster itself can be implemented in the context of the foregoing environments.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A non-transitory computer readable medium having stored thereon a sequence of instructions which, when stored in memory and executed by a processor cause the processor to perform acts for computing cluster bring-up, the acts comprising:
receiving a specification of a computing cluster to be established within a cloud computing infrastructure, wherein the computing cluster forms a clustered virtualization environment corresponding to two or more nodes within the cloud computing infrastructure;
identifying a leader node from among the two or more nodes; and
using the leader node to manage a cluster bring-up process for an as yet unformed computing cluster, wherein the cluster bring-up process is self-managed by the leader node from within the cloud computing infrastructure.

2. The non-transitory computer readable medium of claim 1, wherein the leader node manages the cluster bring-up process without communicating to an external manager through the cloud.

3. The non-transitory computer readable medium of claim 1, further comprising instructions which, when stored in memory and executed by the processor cause the processor to perform further acts of executing bring-up instructions to organize the computing cluster into a fault-tolerant configuration.

4. The non-transitory computer readable medium of claim 3, further comprising instructions which, when stored in memory and executed by the processor cause the processor to perform further acts of, upon detecting a loss of at least one leader-follower relationship, electing a new leader node.

5. The non-transitory computer readable medium of claim 3, wherein the cluster bring-up process is performed within a virtual private cloud.

6. The non-transitory computer readable medium of claim 3, further comprising instructions which, when stored in memory and executed by the processor cause the processor to perform further acts of loading a set of initial bring-up operations into the leader node.

7. The non-transitory computer readable medium of claim 1, further comprising instructions which, when stored in memory and executed by the processor cause the processor to perform further acts of disconnecting an initiating module from the cloud computing infrastructure.

8. A method for computing cluster bring-up, the method comprising:
receiving a specification of a computing cluster to be established within a cloud computing infrastructure, wherein the computing cluster forms a clustered virtualization environment corresponding to two or more nodes within the cloud computing infrastructure;
identifying a leader node from among the two or more nodes; and
using the leader node to manage a cluster bring-up process for an as yet unformed computing cluster, wherein the cluster bring-up process is self-managed by the leader node from within the cloud computing infrastructure.

9. The method of claim 8, wherein the leader node manages the cluster bring-up process without communicating to an external manager through the cloud.

10. The method of claim 8, further comprising executing bring-up instructions to organize the computing cluster into a fault-tolerant configuration.

11. The method of claim 10, further comprising, upon detecting a loss of at least one leader-follower relationship, electing a new leader node.

12. The method of claim 10, wherein the cluster bring-up process is performed within a virtual private cloud.

13. The method of claim 10, further comprising loading a set of initial bring-up operations into the leader node.

14. The method of claim 8, further comprising disconnecting an initiating module from the cloud computing infrastructure.

15. A system for computing cluster bring-up, the system comprising:
a storage medium having stored thereon a sequence of instructions; and
a processor that executes the sequence of instructions to cause the processor to perform acts comprising,
receiving a specification of a computing cluster to be established within a cloud computing infrastructure, wherein the computing cluster forms a clustered virtualization environment corresponding to two or more nodes within the cloud computing infrastructure;
identifying a leader node from among the two or more nodes; and
using the leader node to manage a cluster bring-up process for an as yet unformed computing cluster, wherein the cluster bring-up process is self-managed by the leader node from within the cloud computing infrastructure.

16. The system of claim 15, wherein the leader node manages the cluster bring-up process without communicating to an external manager through the cloud.

17. The system of claim 15, further comprising instructions which, when stored in memory and executed by the processor cause the processor to perform further acts of executing bring-up instructions to organize the computing cluster into a fault-tolerant configuration.

18. The system of claim 17, further comprising instructions which, when stored in memory and executed by the processor cause the processor to perform further acts of, upon detecting a loss of at least one leader-follower relationship, electing a new leader node.

19. The system of claim 17, wherein the cluster bring-up process is performed within a virtual private cloud.

20. The system of claim 17, further comprising instructions which, when stored in memory and executed by the processor cause the processor to perform further acts of loading a set of initial bring-up operations into the leader node.

21. The system of claim 15, further comprising instructions which, when stored in memory and executed by the processor cause the processor to perform further acts of disconnecting an initiating module from the cloud computing infrastructure.

\* \* \* \* \*